US012755536B2

(12) United States Patent
Petrov et al.

(10) Patent No.: US 12,755,536 B2
(45) Date of Patent: Oct. 6, 2026

(54) METHODS AND SYSTEMS FOR TRACKING CONTEXTS

(71) Applicant: Apple Inc., Cupertino, CA (US)

(72) Inventors: Elizabeth V. Petrov, Princeton, NJ (US); Devin W. Chalmers, Oakland, CA (US); Ioana Negoita, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 224 days.

(21) Appl. No.: 18/695,273

(22) PCT Filed: Sep. 16, 2022

(86) PCT No.: PCT/US2022/043776

§ 371 (c)(1),
(2) Date: Mar. 25, 2024

(87) PCT Pub. No.: WO2023/049042

PCT Pub. Date: Mar. 30, 2023

(65) Prior Publication Data

US 2024/0412516 A1 Dec. 12, 2024

Related U.S. Application Data

(60) Provisional application No. 63/400,291, filed on Aug. 23, 2022, provisional application No. 63/247,978, filed on Sep. 24, 2021.

(51) Int. Cl.
*G06V 20/50* (2022.01)
*G06F 16/535* (2019.01)
(Continued)

(52) U.S. Cl.
CPC ............ *G06V 20/50* (2022.01); *G06F 16/535* (2019.01); *G06F 16/5866* (2019.01); *G06V 10/768* (2022.01); *G10L 15/22* (2013.01)

(58) Field of Classification Search
None
See application file for complete search history.

(56) References Cited

U.S. PATENT DOCUMENTS

2009/0144267 A1 6/2009 Cook et al.
2018/0322706 A1 * 11/2018 Drouin .................... G06F 3/011
(Continued)

FOREIGN PATENT DOCUMENTS

GB 2513865 A 11/2014
WO 2019236348 A1 12/2019

OTHER PUBLICATIONS

PCT International Search Report and Written Opinion dated Jan. 9, 2023, PCT International Application No. PCT/ US2022/043776, pp. 1-15.

*Primary Examiner* — David Ometz
(74) *Attorney, Agent, or Firm* — Fernando & Partners, LLP

(57) ABSTRACT

In one implementation, a method of tracking contexts is performed at a device including an image sensor, one or more processors, and non-transitory memory. The method includes capturing, using the image sensor, an image of an environment at a particular time. The method includes detecting a context based at least in part on the image of the environment. The method includes, in accordance with a determination that the context is included within a pre-defined set of contexts, storing, in a database, an entry including data indicating detection of the context in association with data indicating the particular time. The method includes receiving a query regarding the context. The method includes providing a response to the query based on the data indicating the particular time.

20 Claims, 31 Drawing Sheets

(51) Int. Cl.

| | |
|---|---|
| ***G06F 16/58*** | (2019.01) |
| ***G06V 10/70*** | (2022.01) |
| ***G10L 15/22*** | (2006.01) |

(56) References Cited

U.S. PATENT DOCUMENTS

| | | | | |
|---|---|---|---|---|
| 2019/0005327 | A1 | 1/2019 | Ekambaram et al. | |
| 2021/0118211 | A1* | 4/2021 | Ansari | G06N 5/02 |

* cited by examiner

METHODS AND SYSTEMS FOR TRACKING CONTEXTS

CROSS-REFERENCE TO RELATED APPLICATIONS

This application is the national phase entry of Intl. Patent App. No. PCT/US2022/043776, filed on Sep. 16, 2022, which claims priority to U.S. Provisional Patent App. No. 63/247,978, filed on Sep. 24, 2021, and U.S. Provisional Patent App. No. 63/400,291, filed on Aug. 23, 2022, which are both all hereby incorporated by reference in their entirety.

TECHNICAL FIELD

The present disclosure generally relates to systems, methods, and devices for tracking contexts.

BACKGROUND

A head-mounted device equipped with a scene camera takes many images of a user's environment. The device can detect contexts in the environment, such as objects or activities of the user (e.g., running, eating, or washing hands) based at least in part on those images. Such detection can be useful for presenting virtual content.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
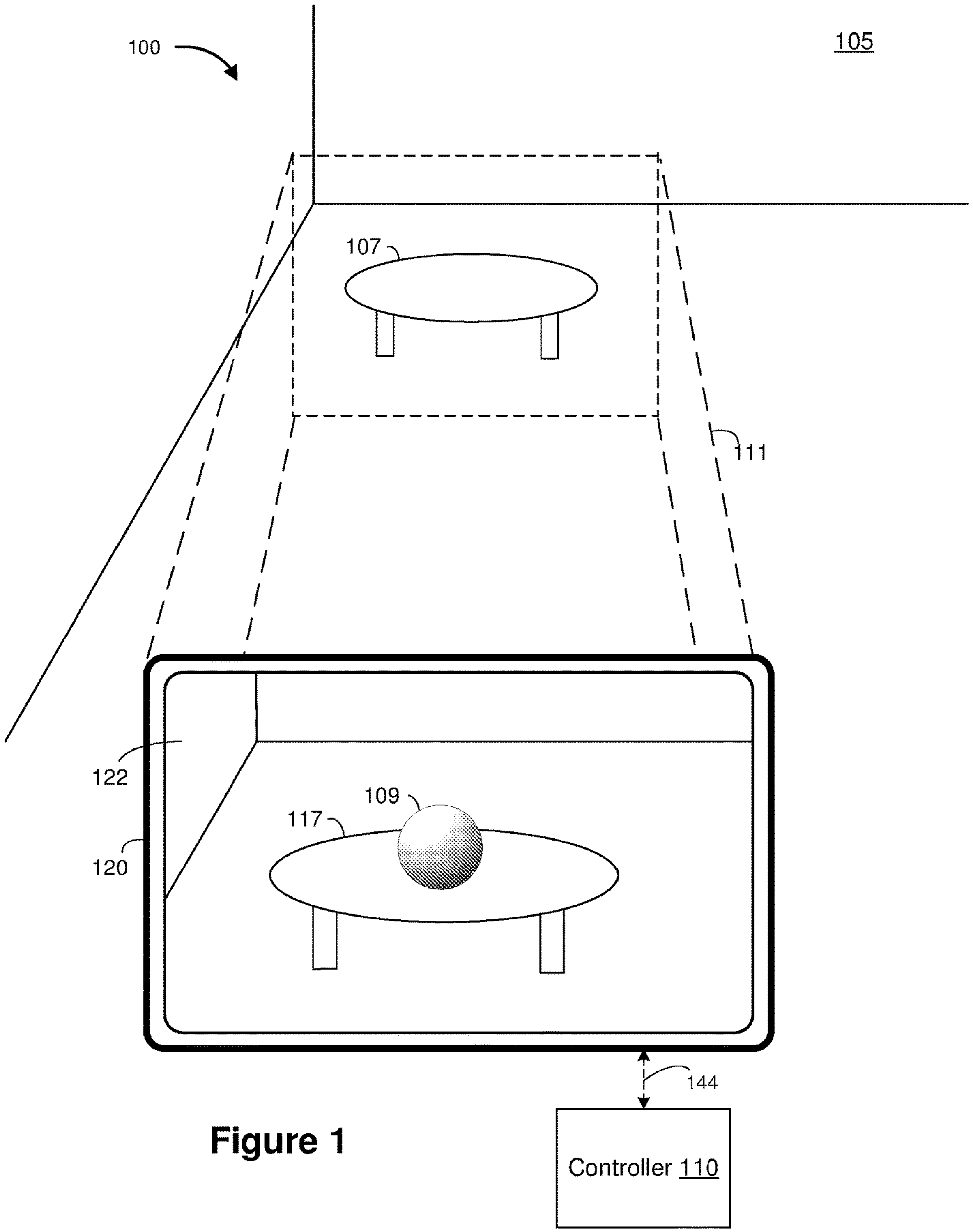
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for tracking contexts. In various implementations, the method is performed by a device including an image sensor, one or more processors, and non-transitory memory. The method includes capturing, using the image sensor, an image of an environment at a particular time. The method includes detecting a context based at least in part on the image of the environment. The method includes, in accordance with a determination that the context is included within a predefined set of contexts, storing, in a database, an entry including data indicating detection of the context in association with data indicating the particular time. The method includes receiving a query regarding the context. The method includes providing a response to the query based on the data indicating the particular time.

Various implementations disclosed herein include devices, systems, and method for tracking statuses of objects. In various implementations, the method is performed at a device including an image sensor, one or more processors, and non-transitory memory. The method includes capturing, using the image sensor, an image of an environment at a particular time. The method includes detecting an object in the image of the environment. The method includes, in accordance with a determination that the object is included within a predefined set of objects, determining a status of the object based at least in part on the image of the environment. The method includes storing, in a database, an entry including data indicating the status of the object in association with data indicating the particular time. The method includes receiving a query regarding the status of the object. The method includes providing a response to the query based on the data indicating the particular time.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, a head-mounted device equipped with a scene camera takes many images of a user's environment throughout days or weeks of usage. The device can detect contexts in the environment, such as objects (e.g., keys or a smartphone), statuses of objects (e.g., on/off or locked/unlocked) or current activities of the user (e.g., running, eating, or washing hands) based at least in part on those images. By storing data indicating the detection in association with a time or location the context was detected in a searchable database, response to queries can be generated.

For example, a user can query "Where did I leave my keys?" and the device can respond with a location of the user's keys. As another example, a user can query "Is the front door locked?" and the device can respond with the status of the front door as either being locked or unlocked. As another example, a user can query "When did I last go for a run?" and the device can provide a time the user last ran.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR sphere 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
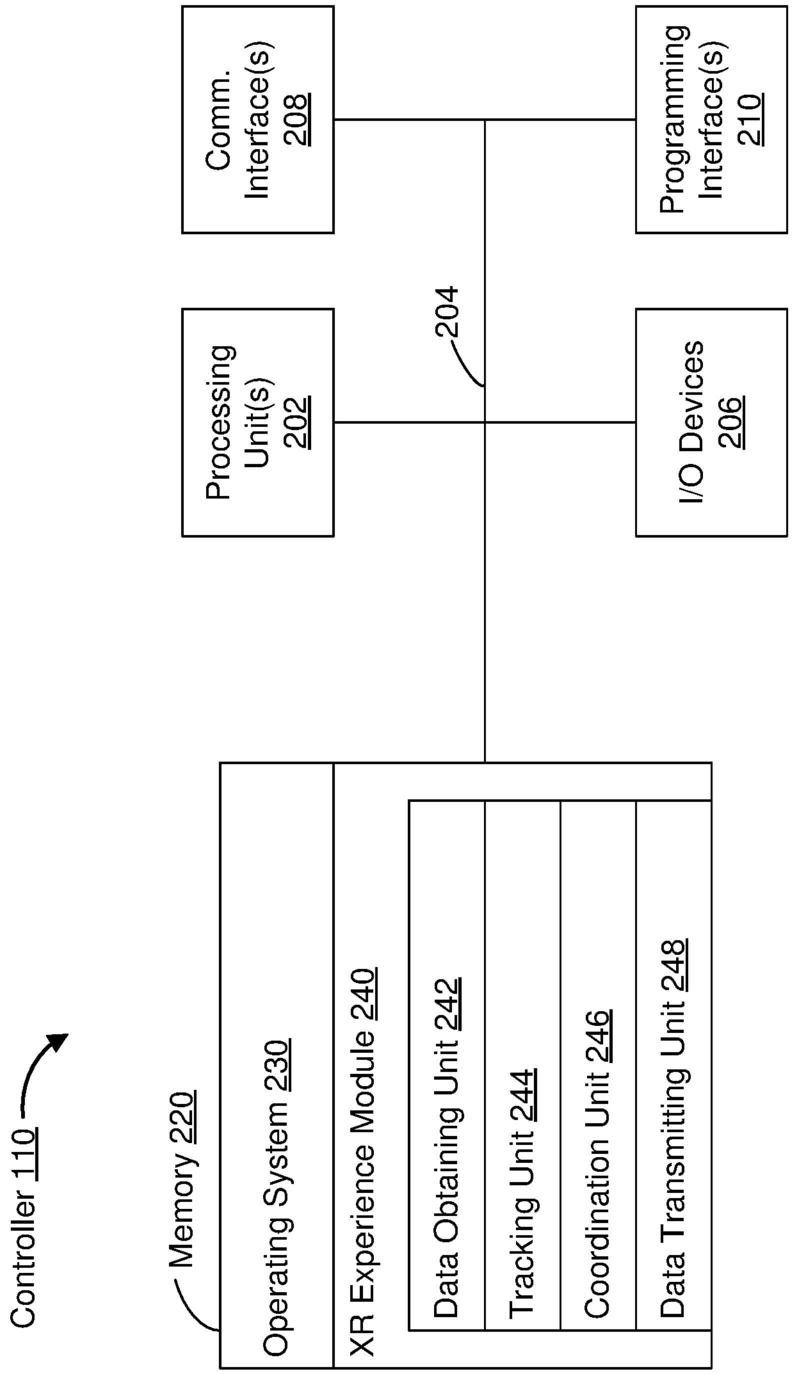
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
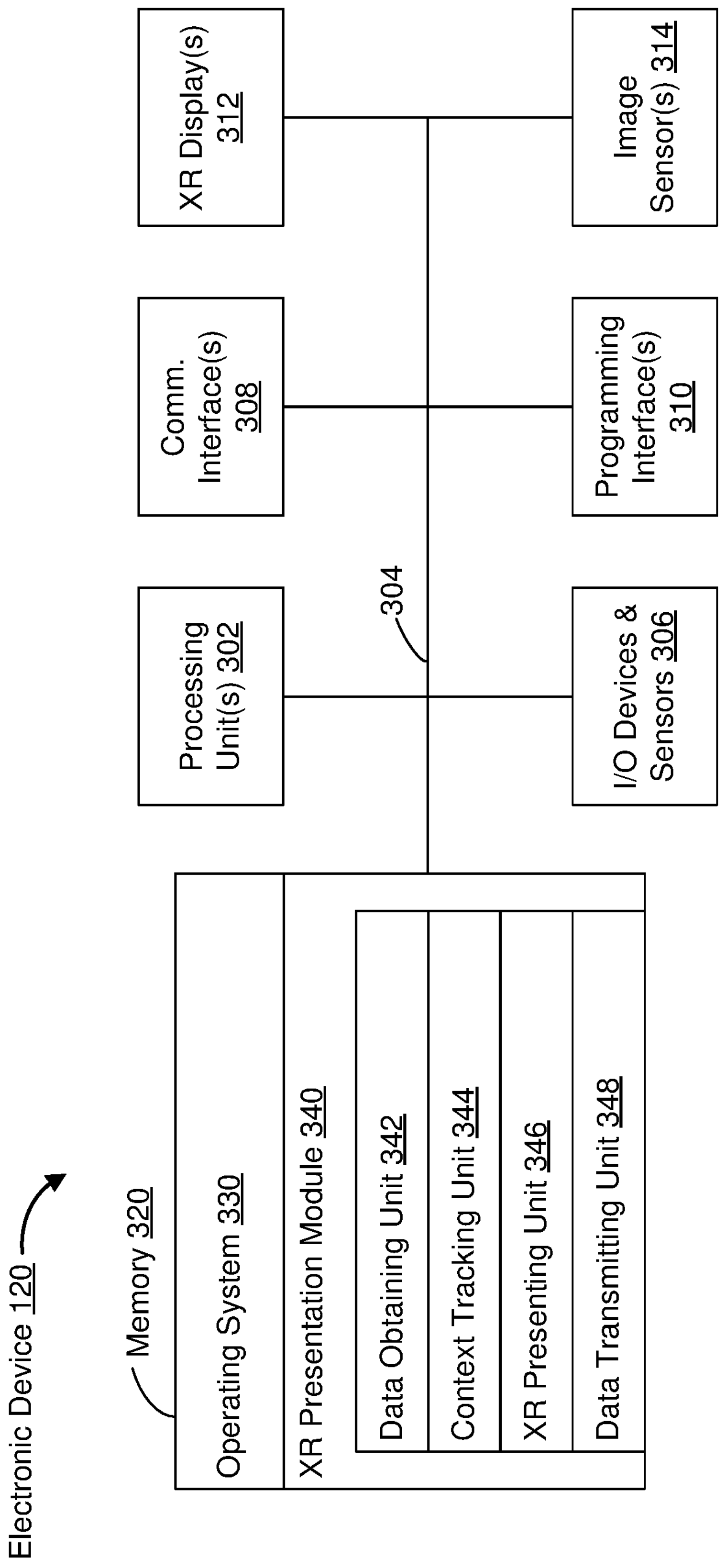
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a context tracking unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the context tracking unit 344 is configured to detect contexts and store data indicative of the detected context in association with data indicative of a time the context was detected. To that end, in various implementations, the context tracking unit 344 includes instructions and/or logic therefor, and heuristics and metadata therefor.

In some implementations, the XR presenting unit 346 is configured to present XR content via the one or more XR displays 312, such as a visual response to a query. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the context tracking unit 344, the XR presenting unit 346, and the data transmitting unit 348 are shown as residing on a single device (e.g., the electronic device 120), it should be understood that in other implementations, any combination of the data obtaining unit 342, the context tracking unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
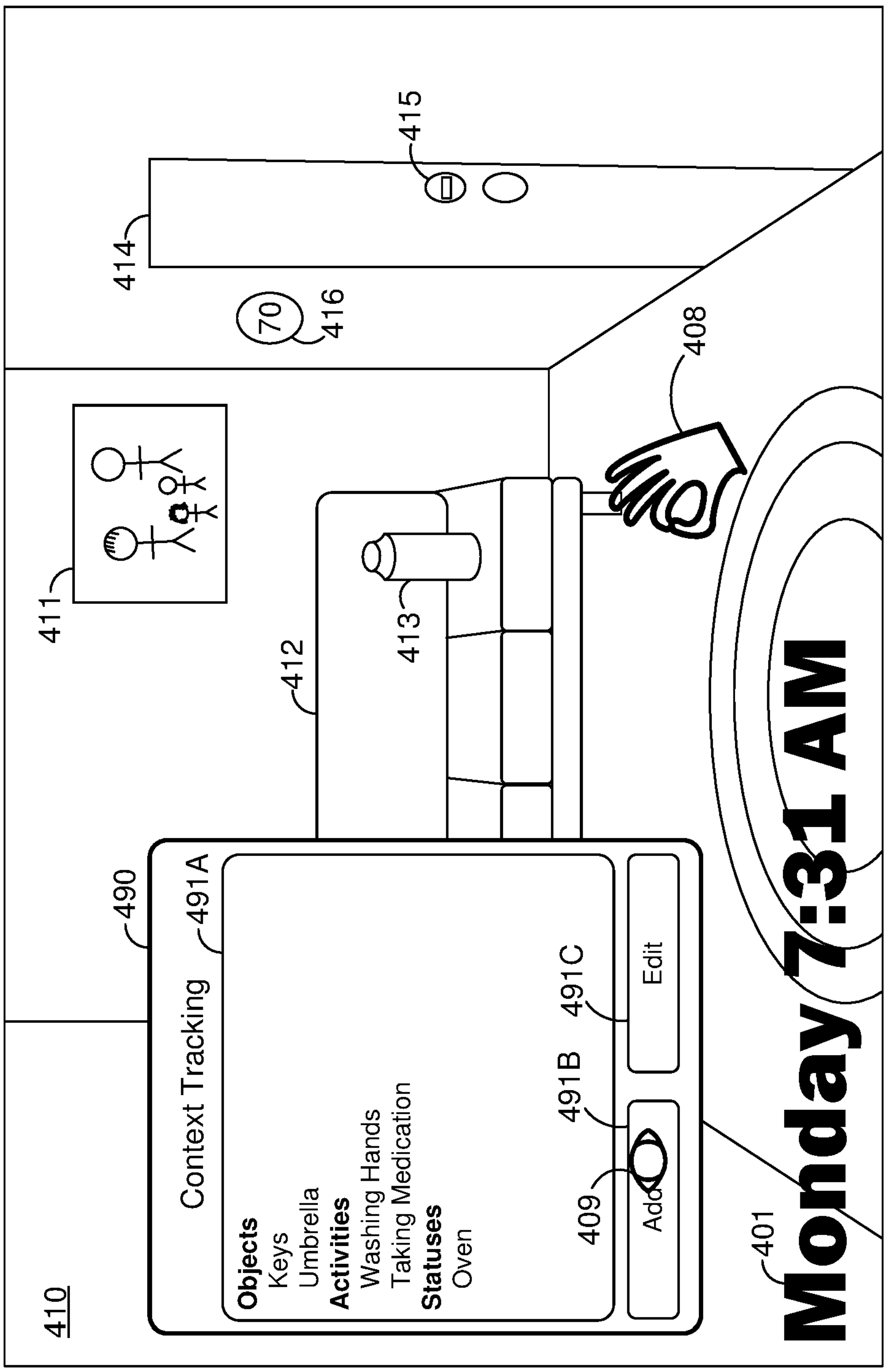
FIGS. 4A-4Z illustrate various XR environments during various time periods in accordance with some implementations.
Figure 4B:
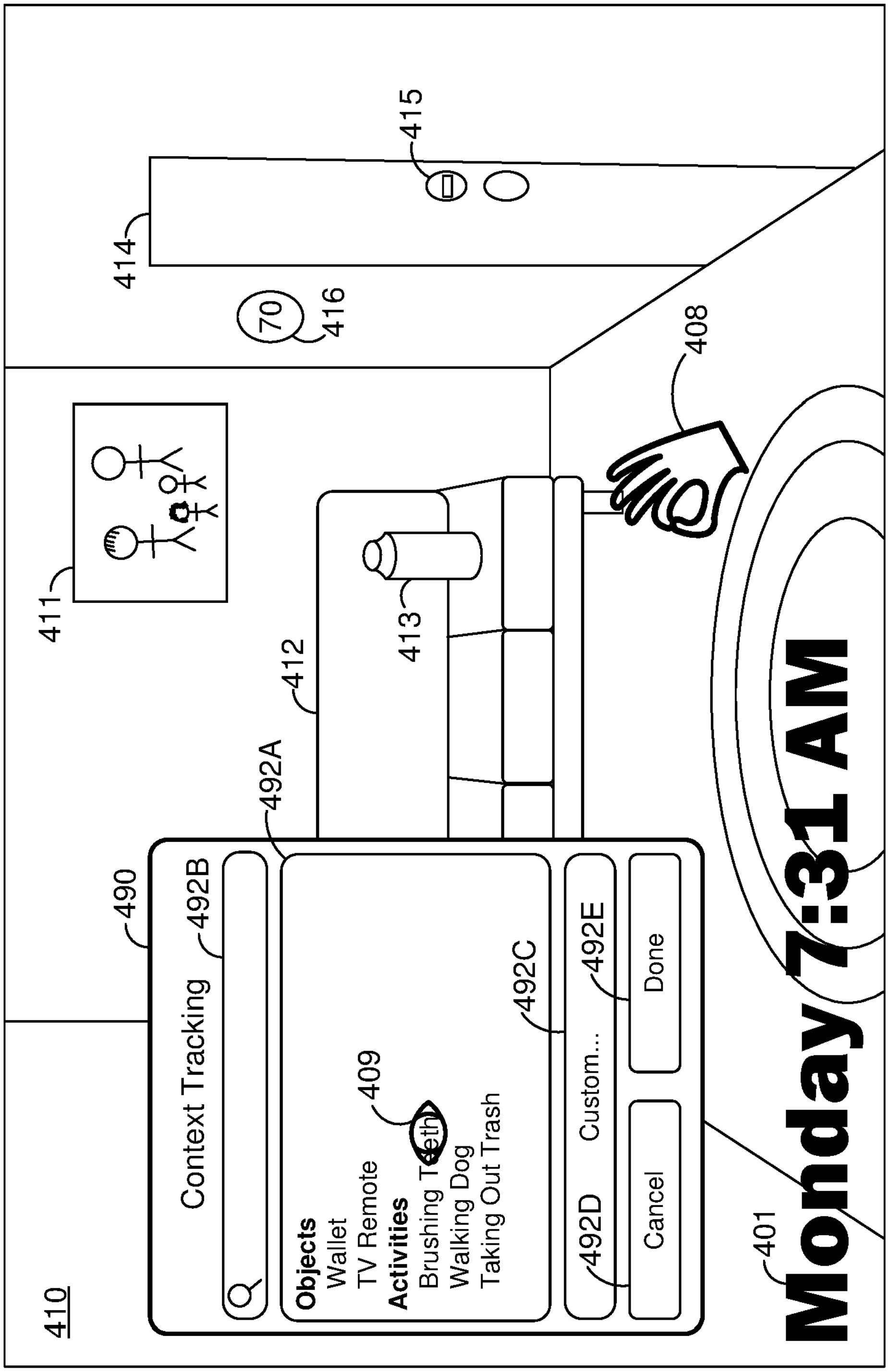
Figure 4C:
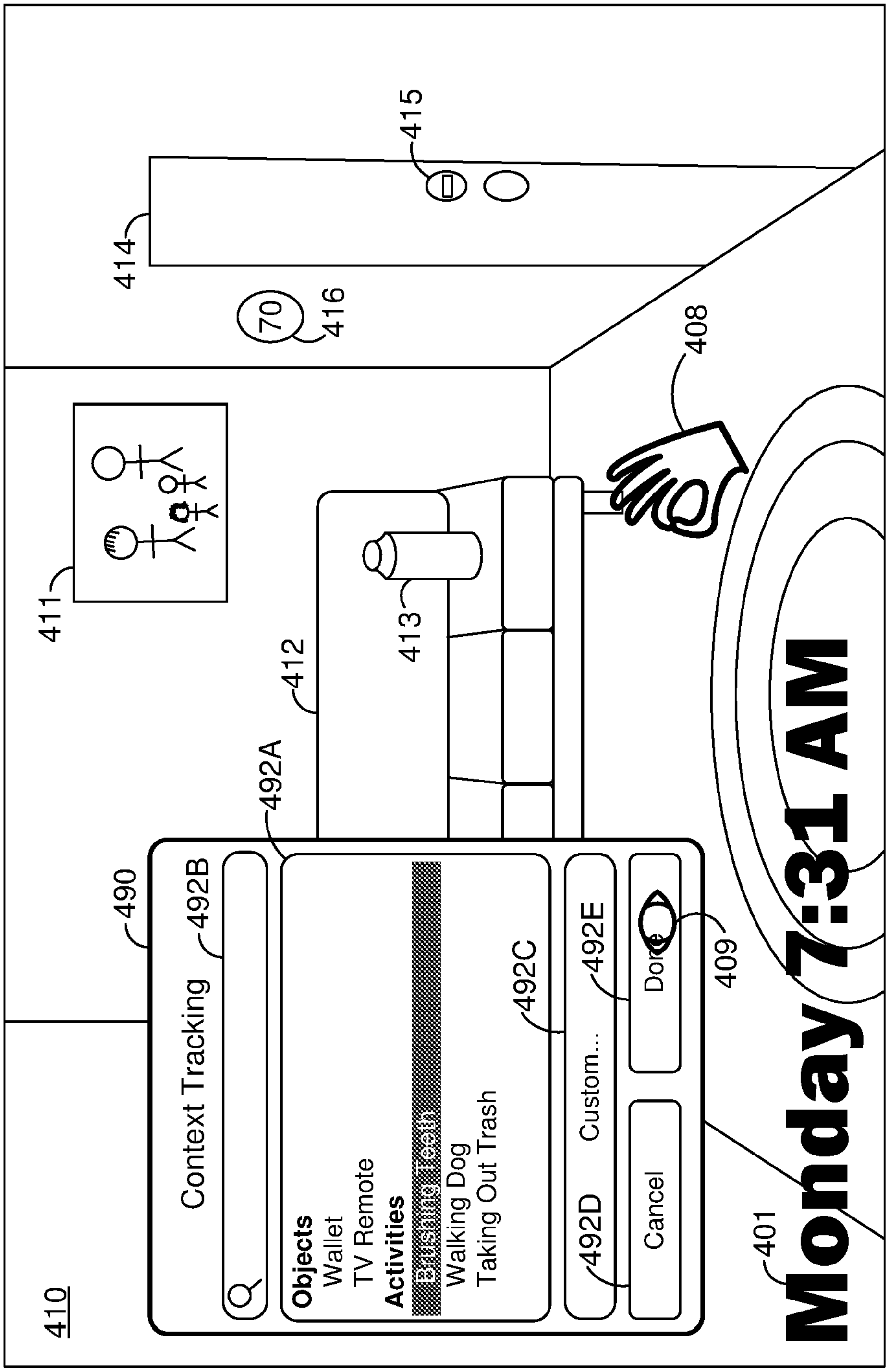
Figure 4D:
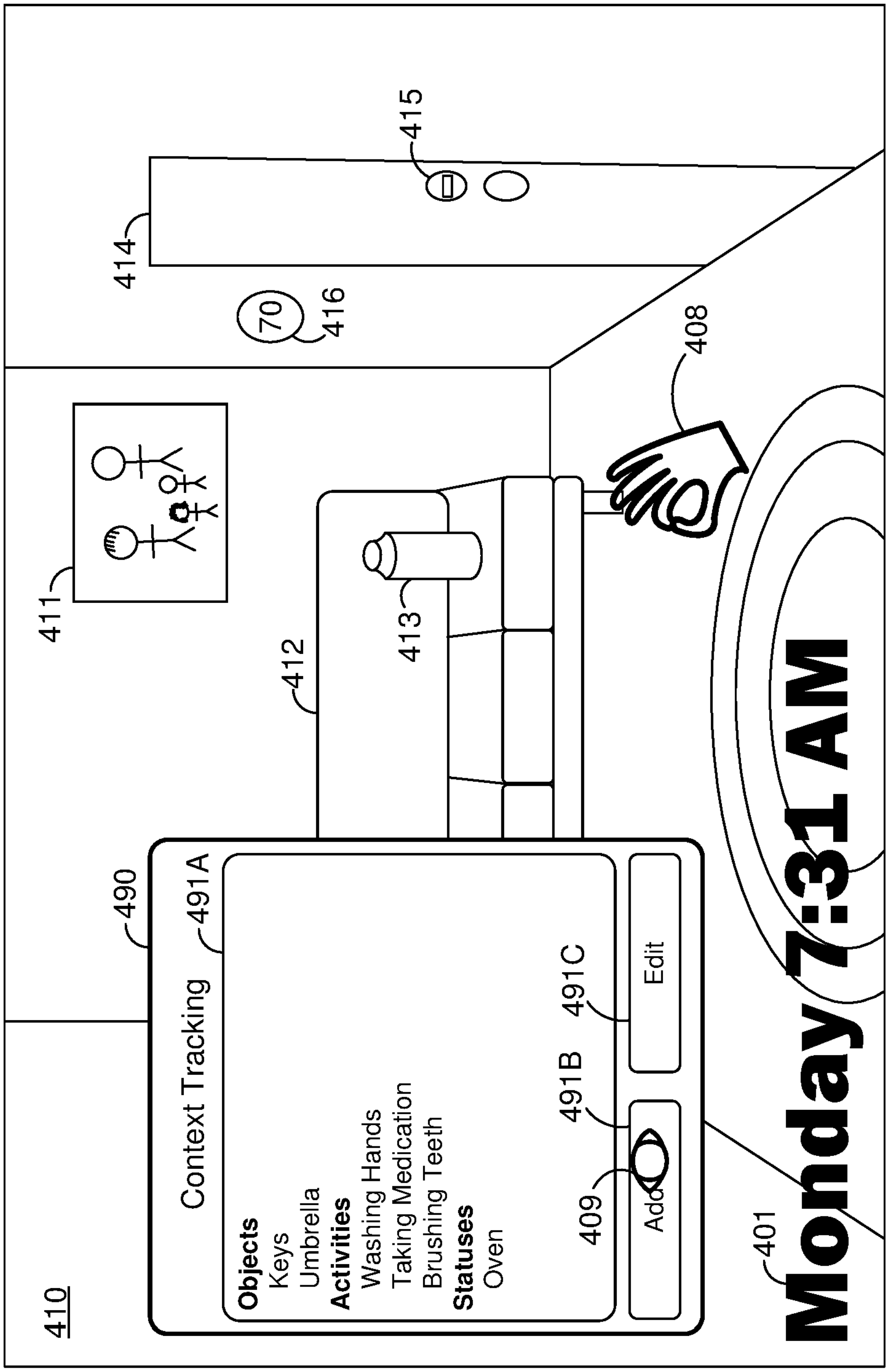
Figure 4E:
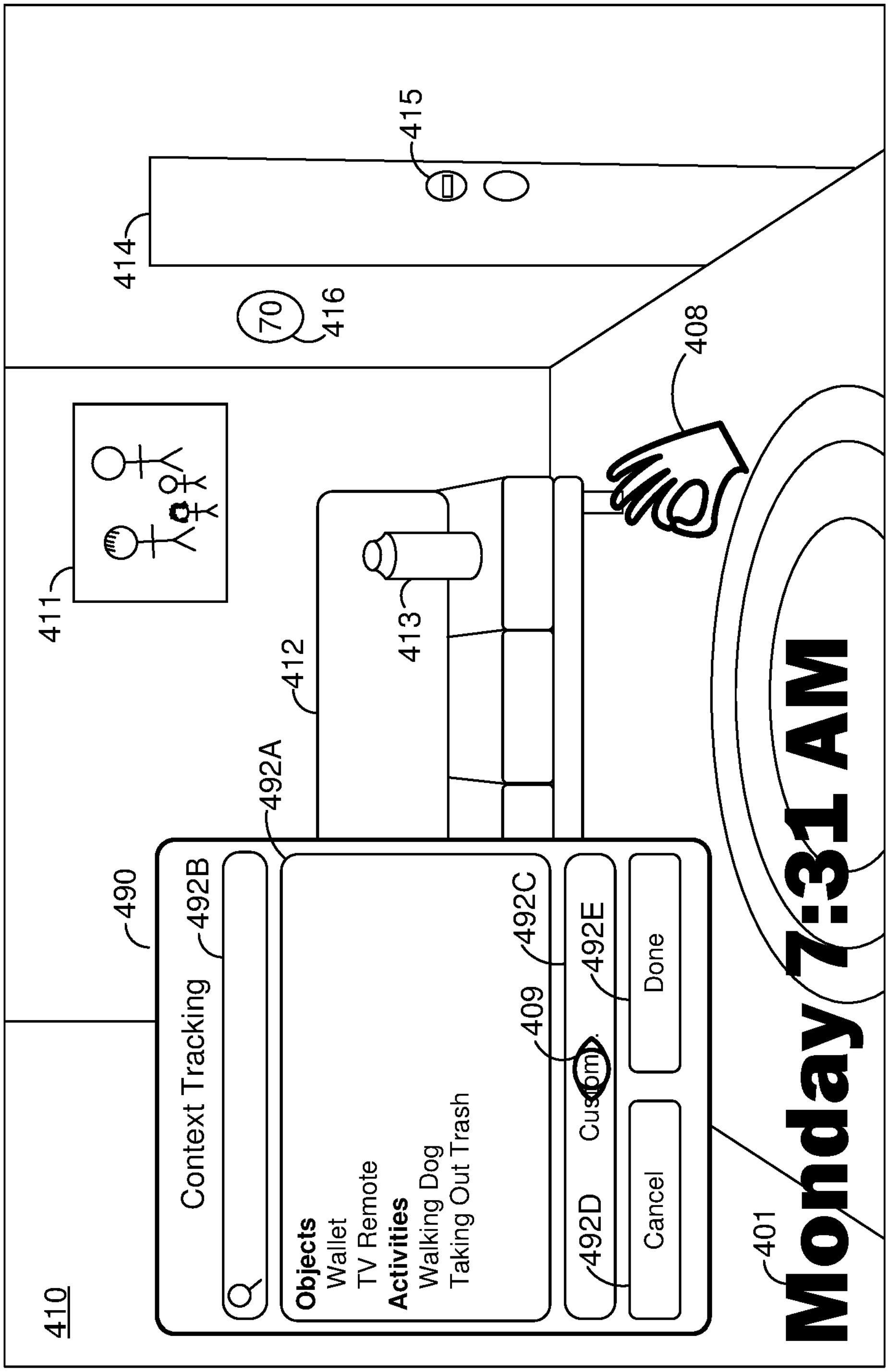
Figure 4F:
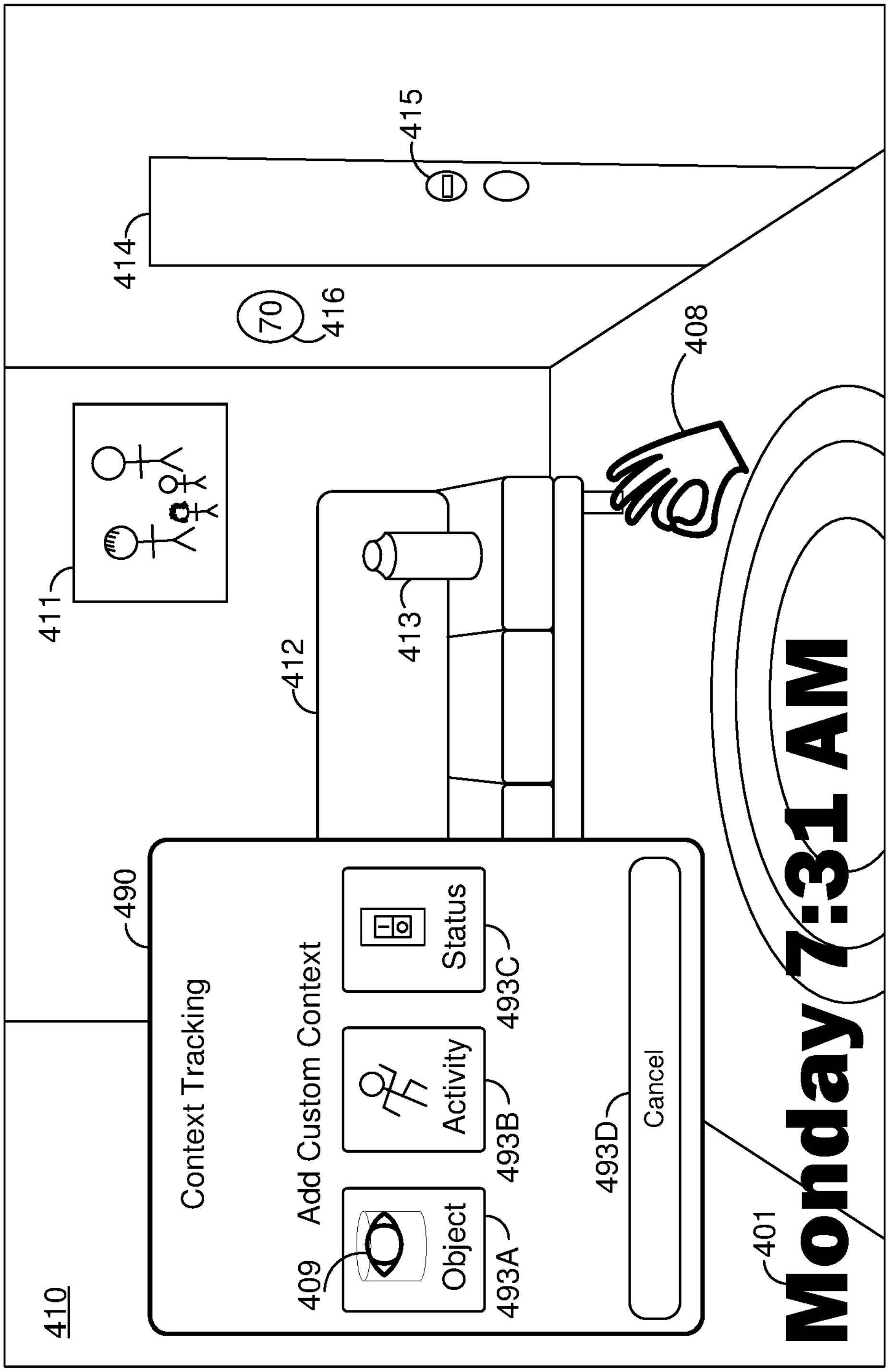
Figure 4G:
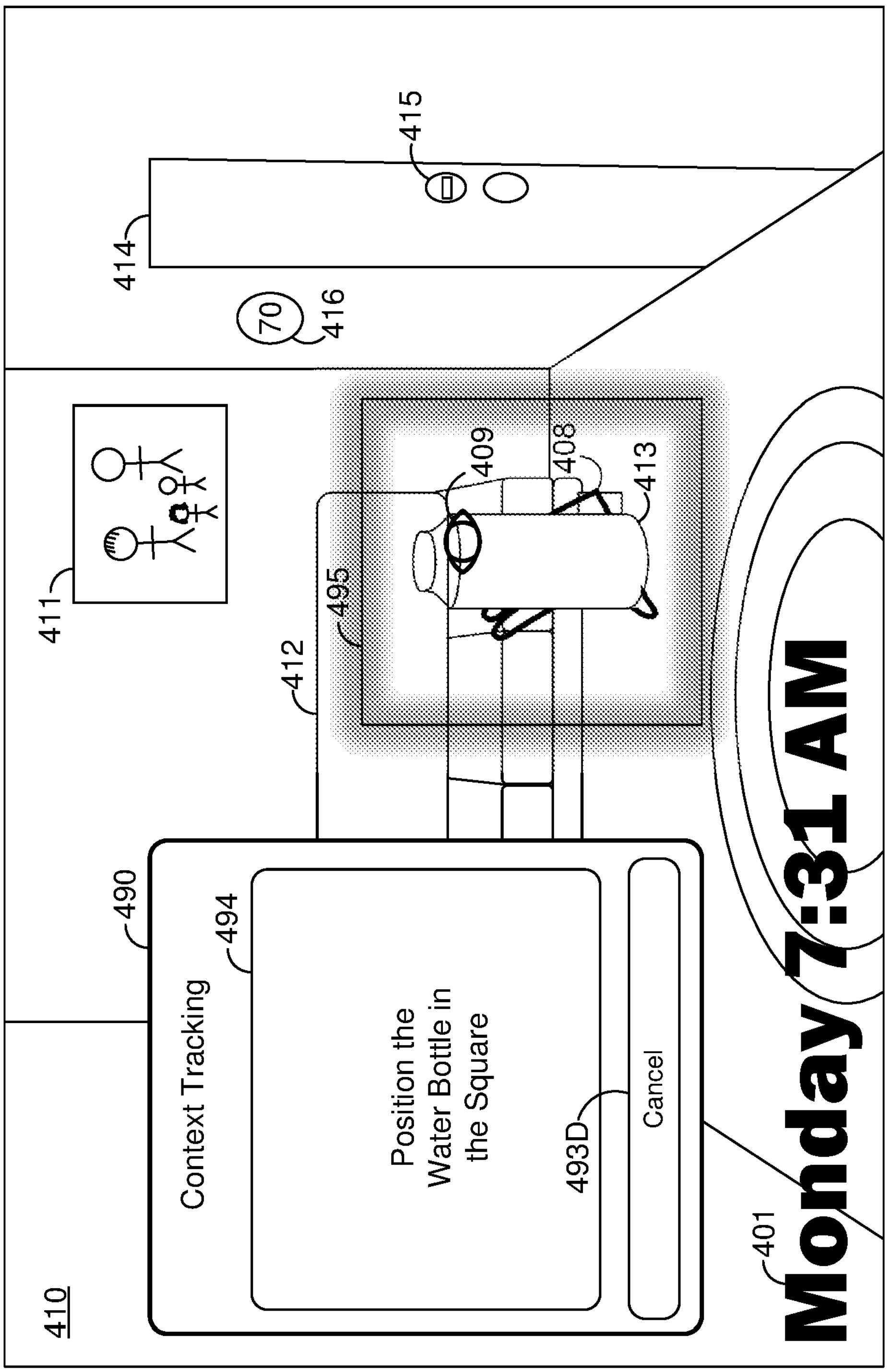
Figure 4H:
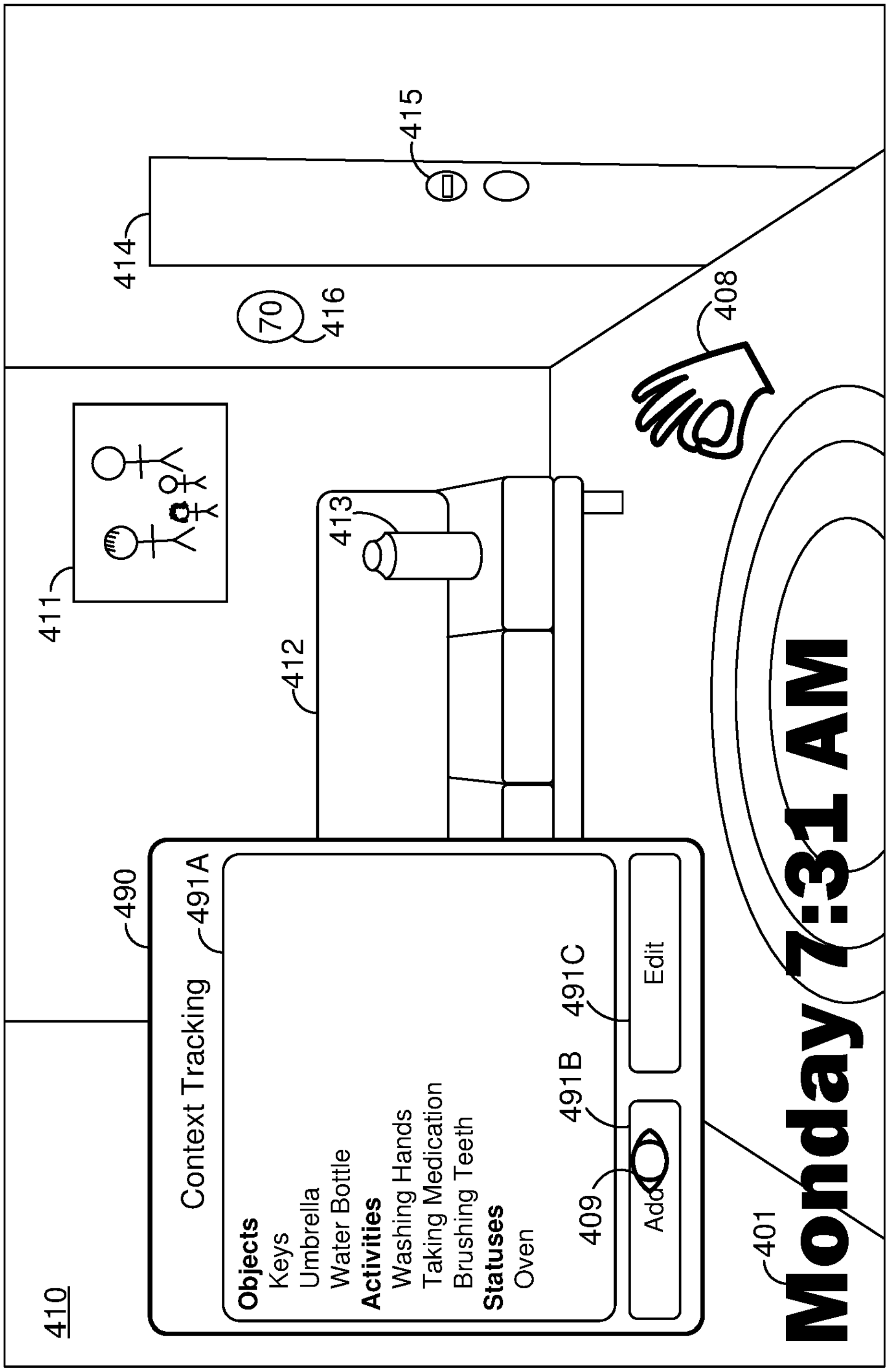
Figure 4I:
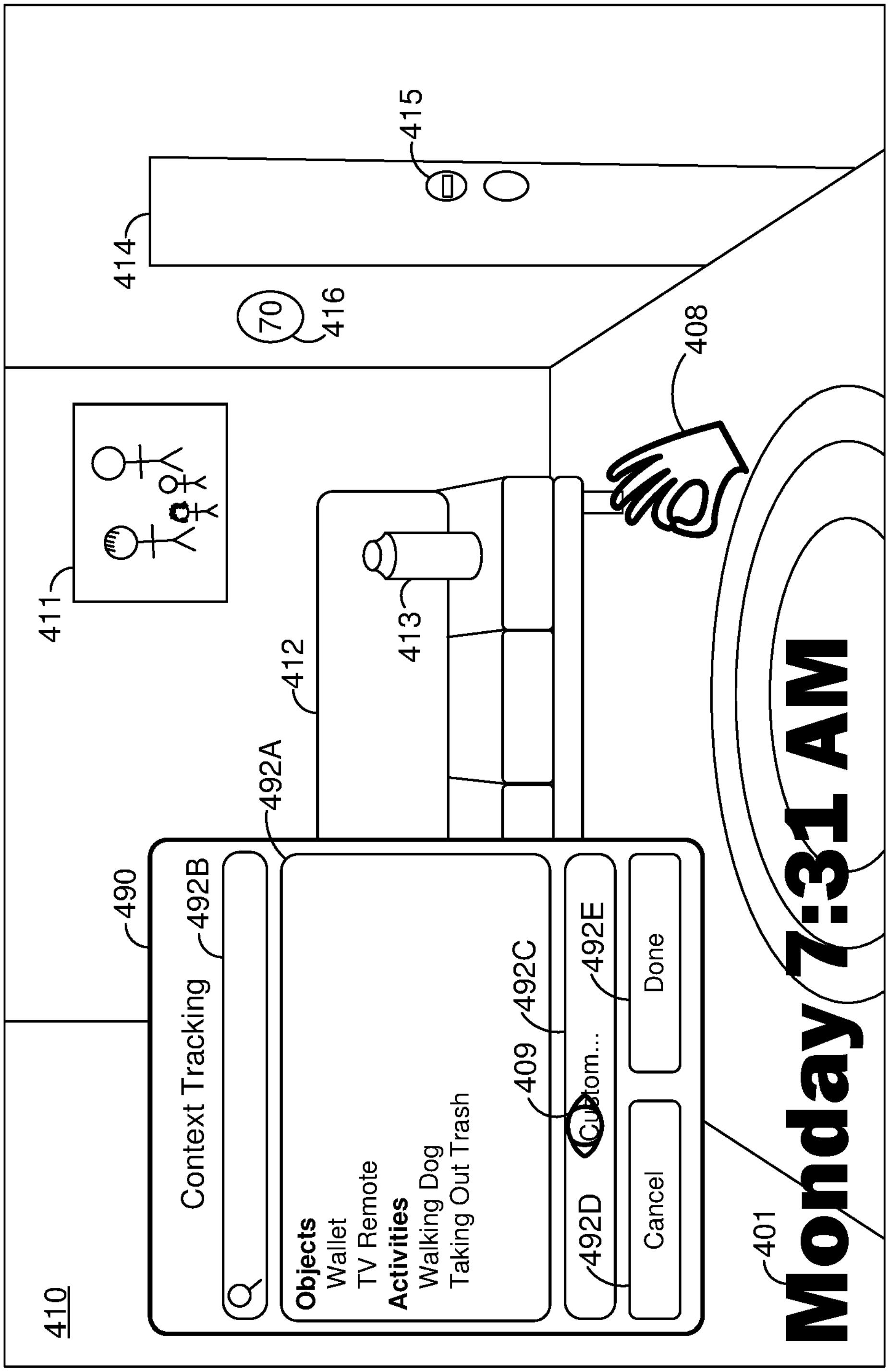
Figure 4J:
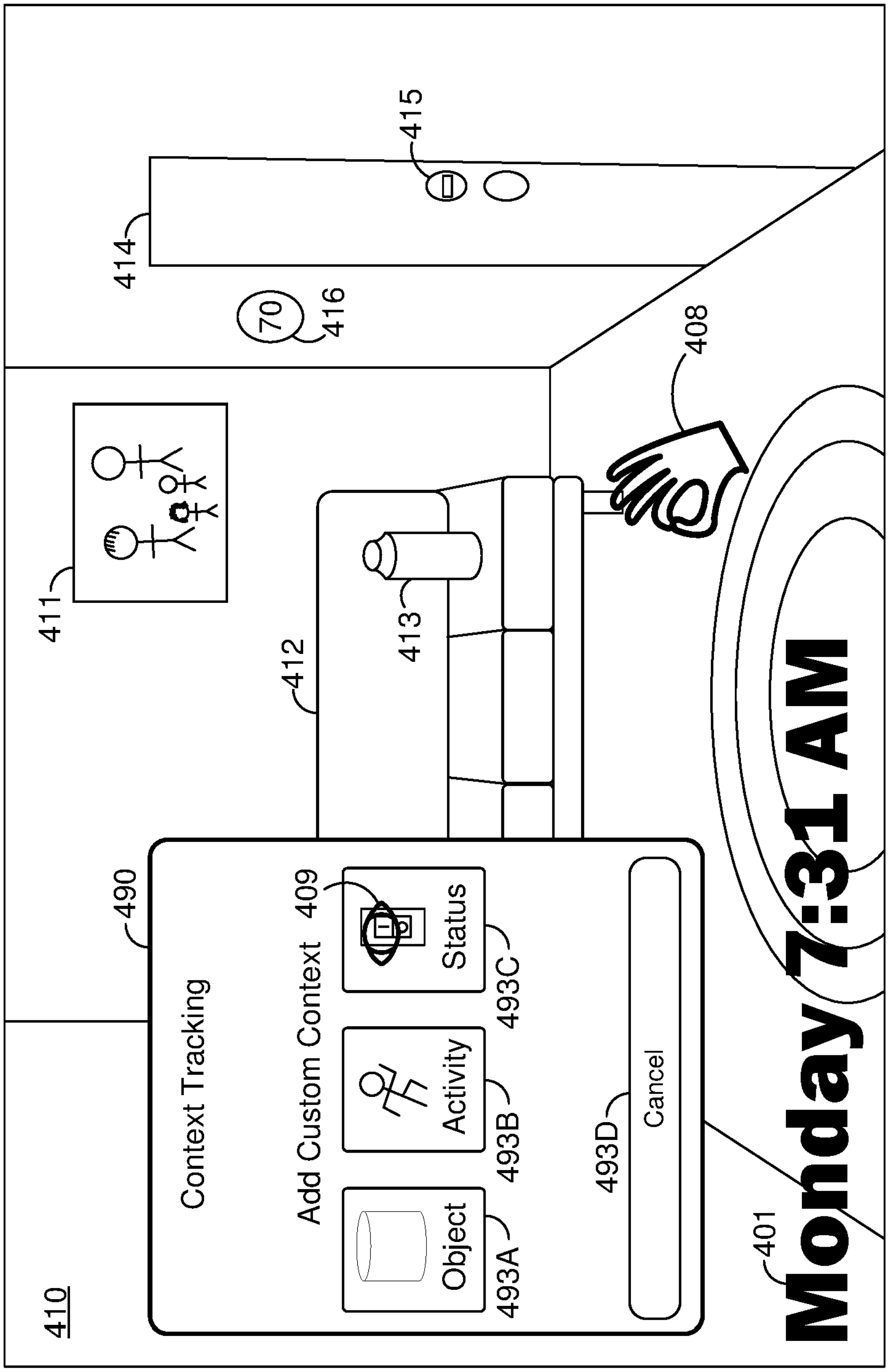
Figure 4K:
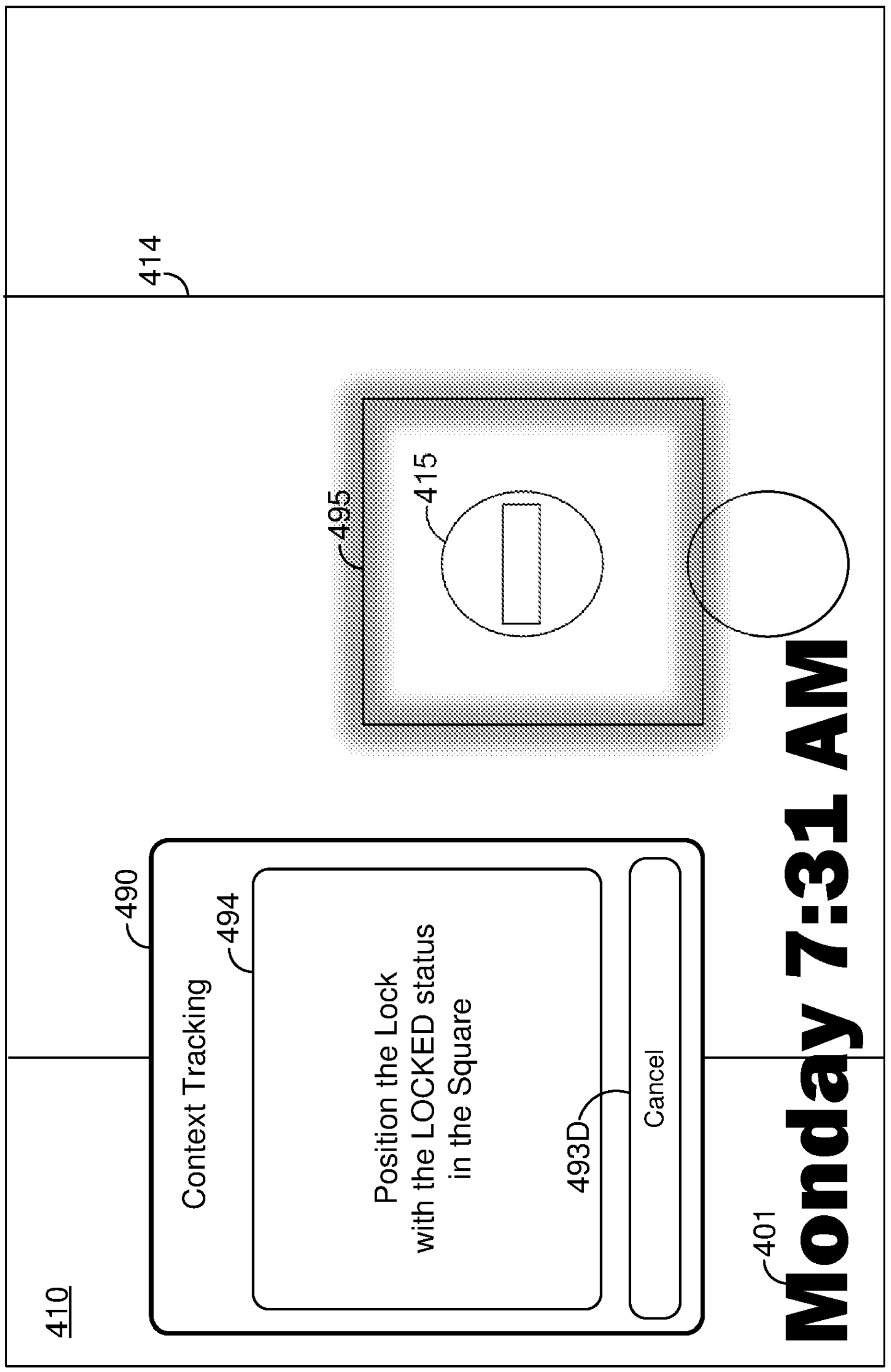
Figure 4L:
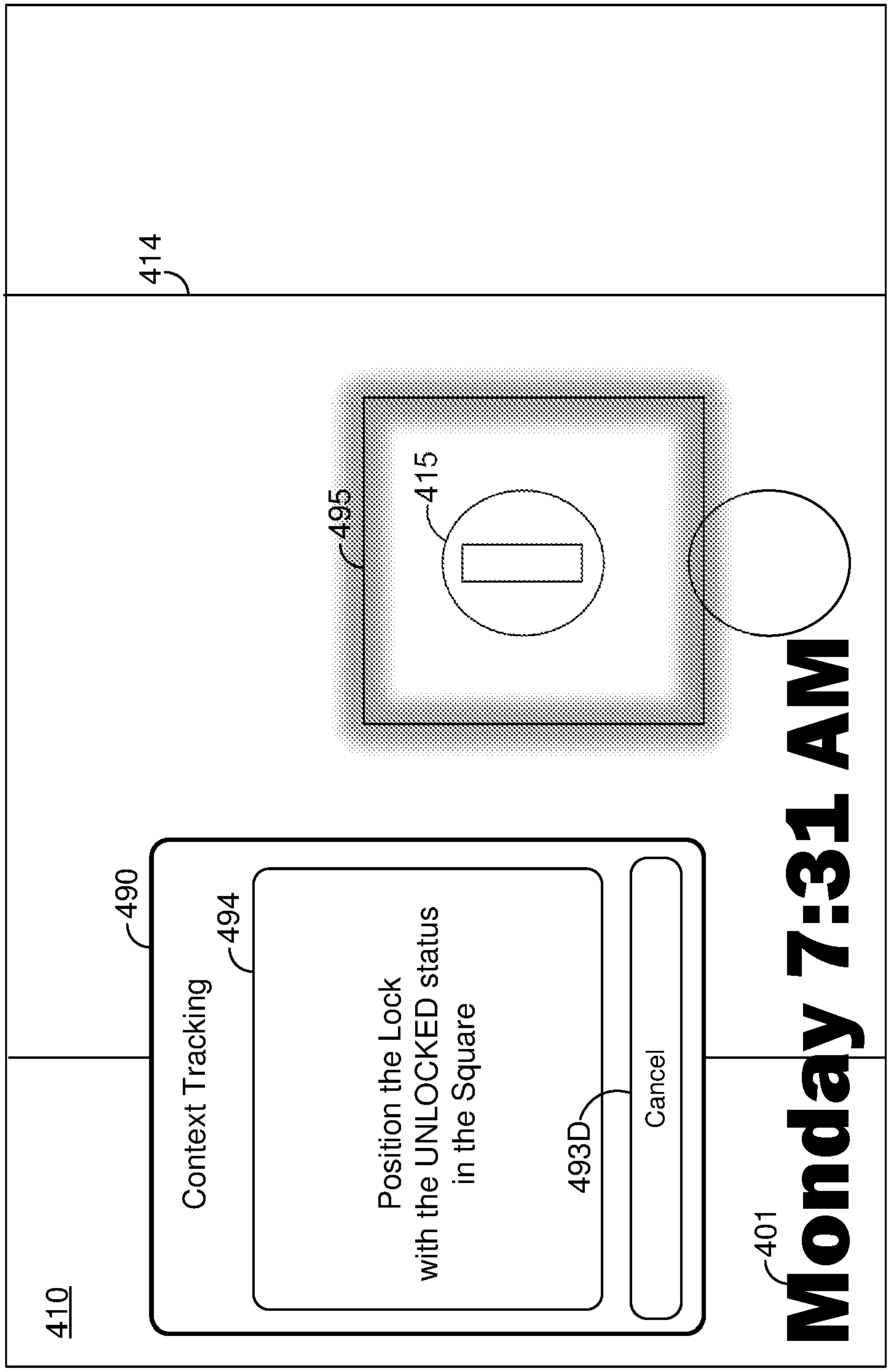
Figure 4M:
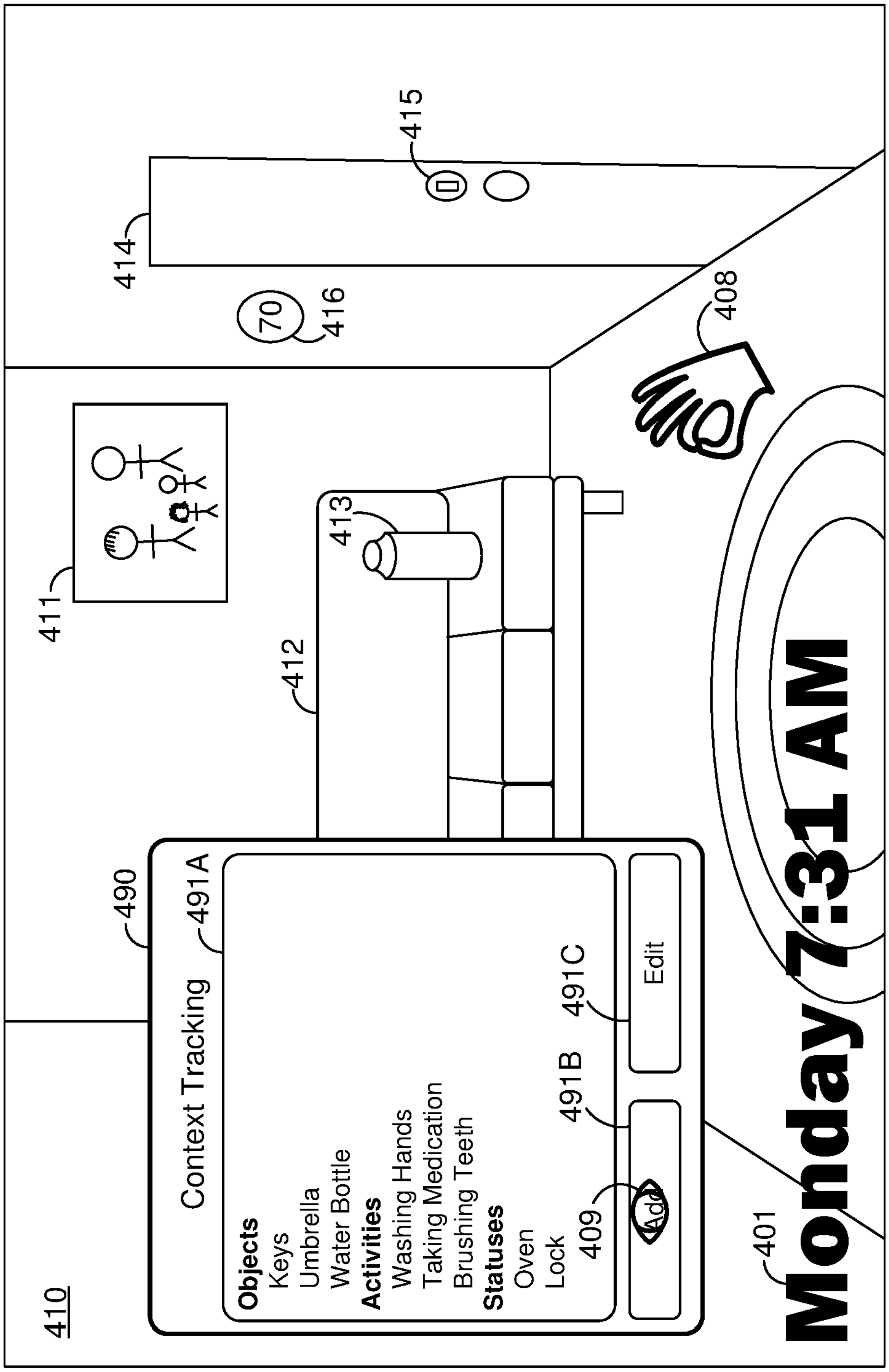
Figure 4N:
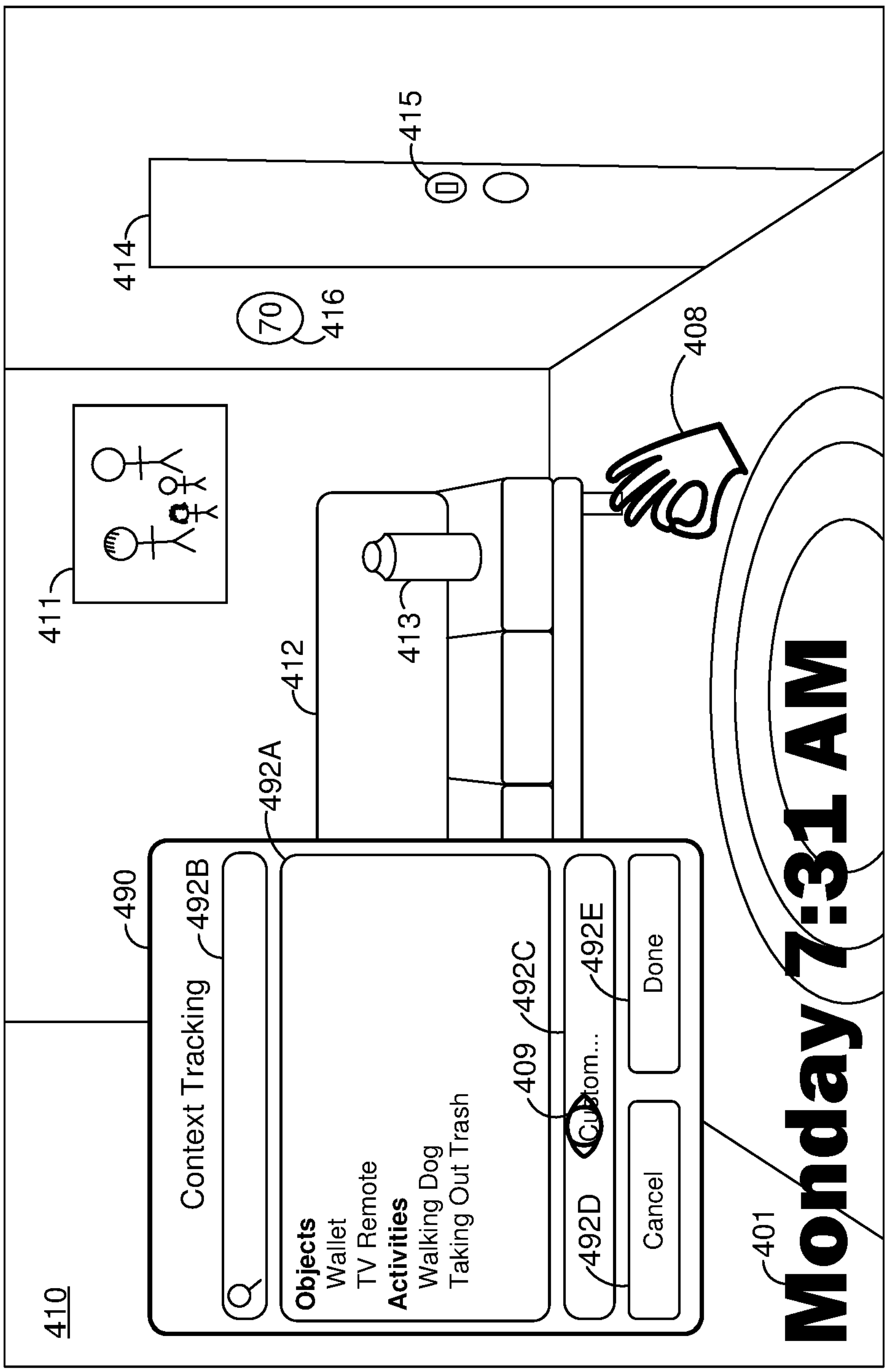
Figure 4O:
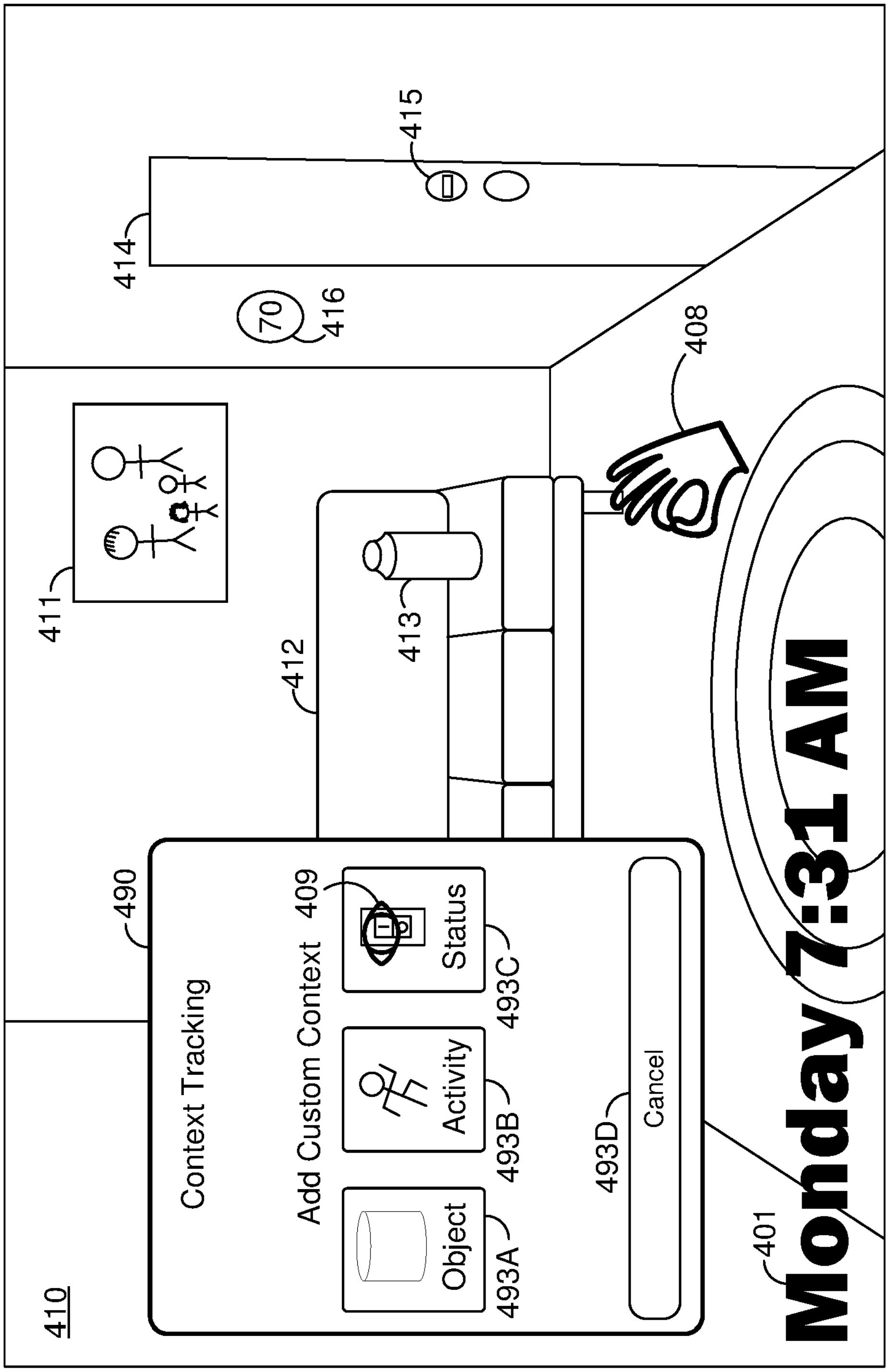
Figure 4P:
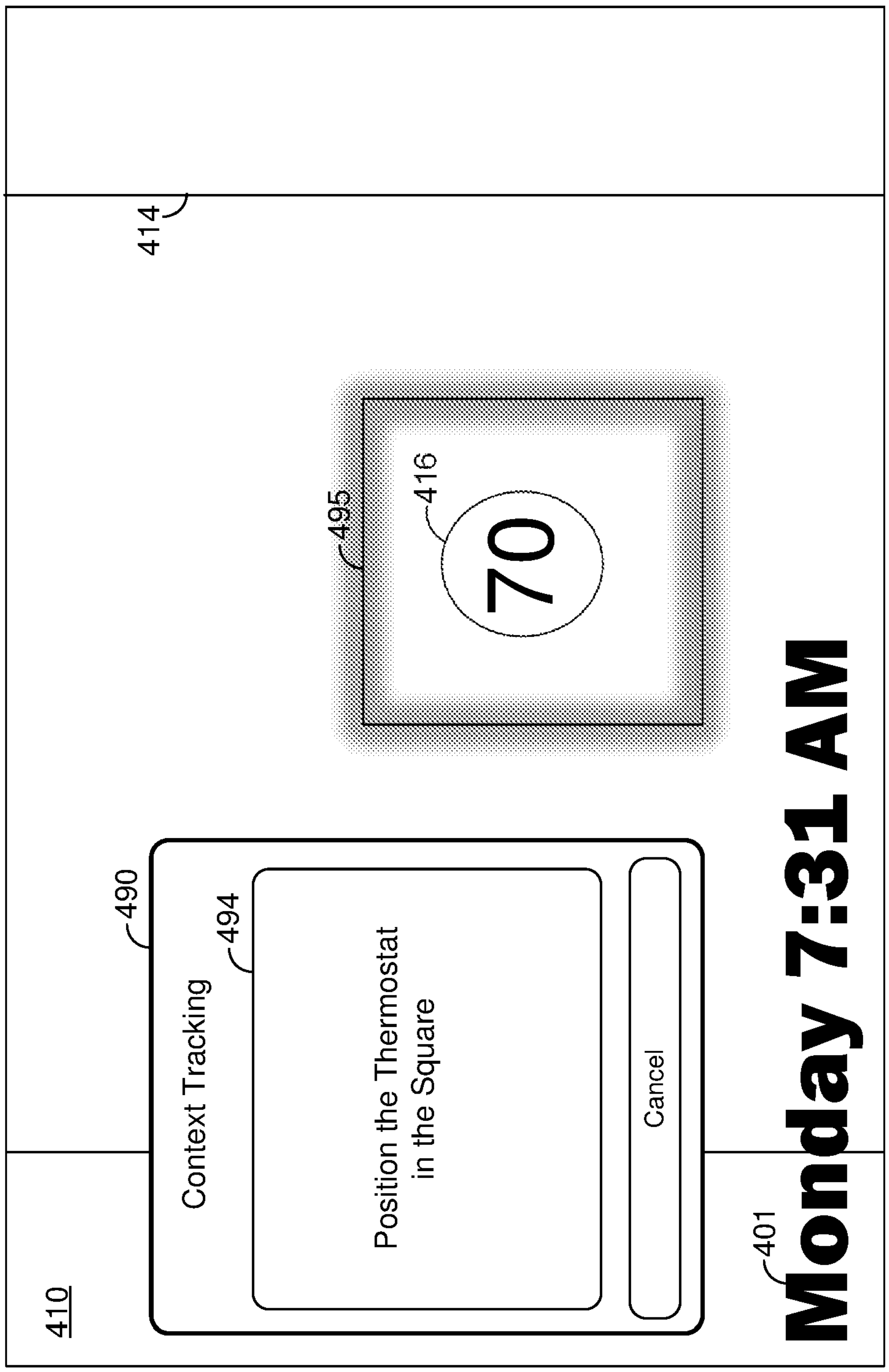
Figure 4Q:
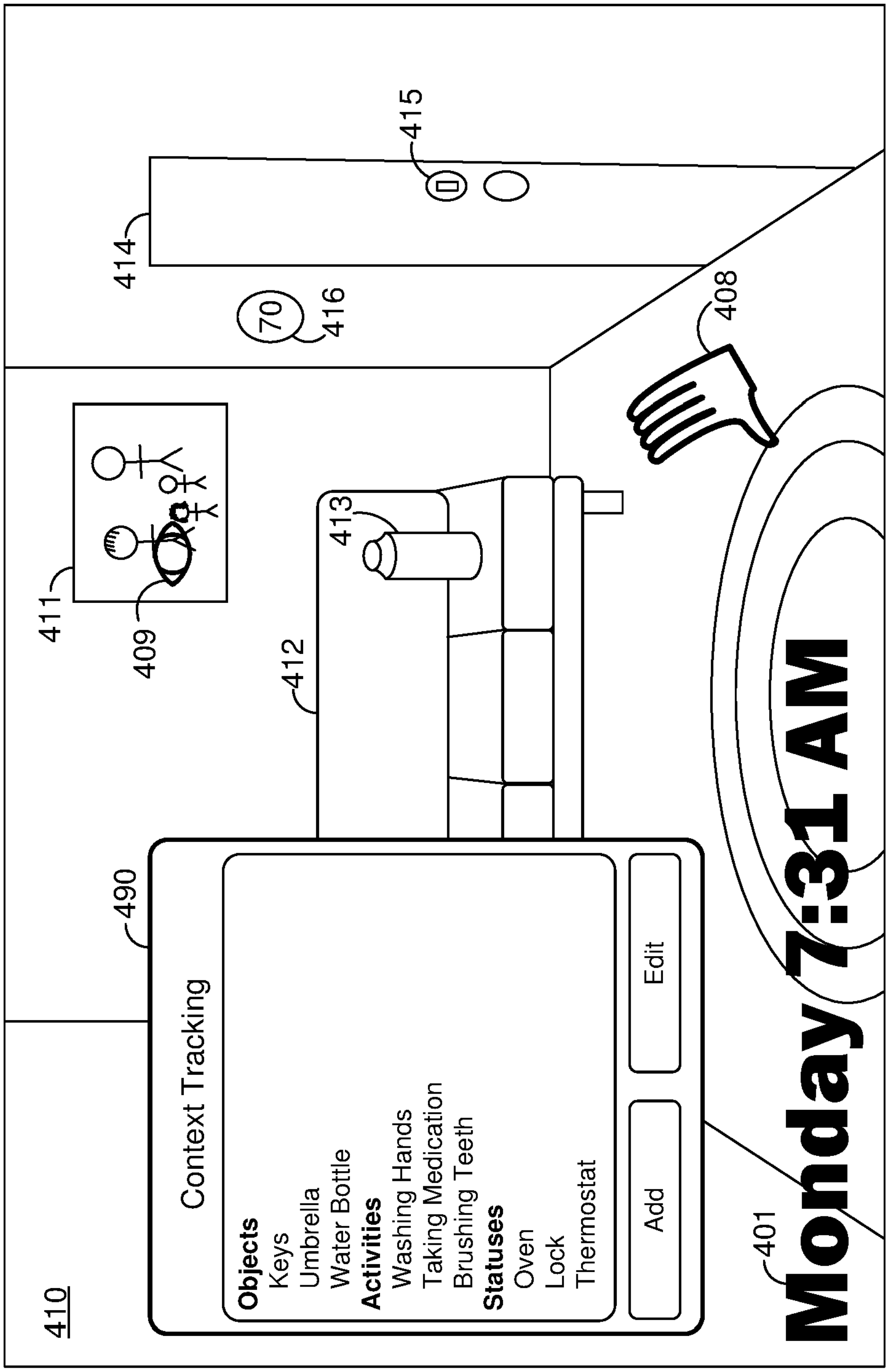
Figure 4R:
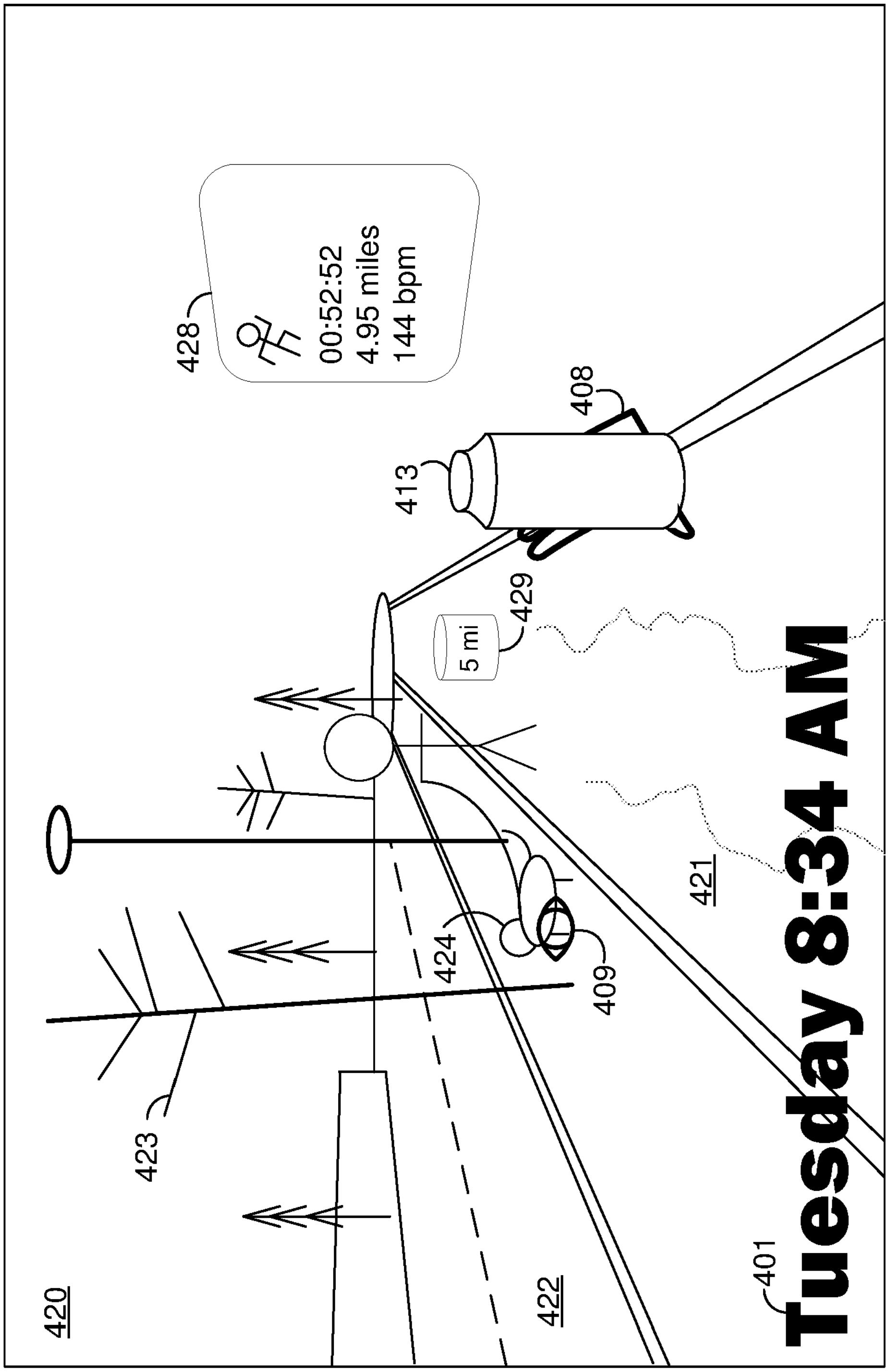
Figure 4S:
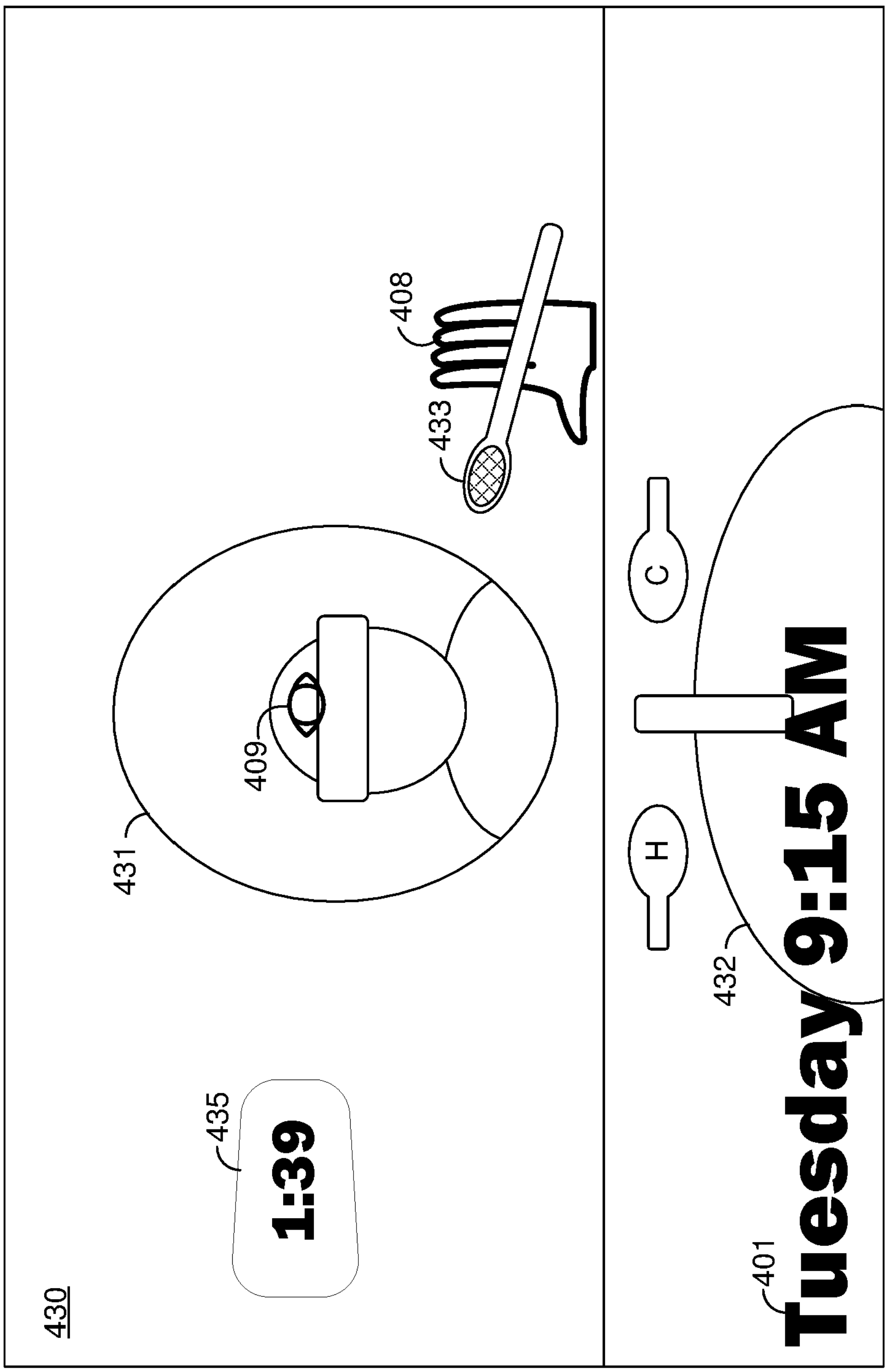
Figure 4T:
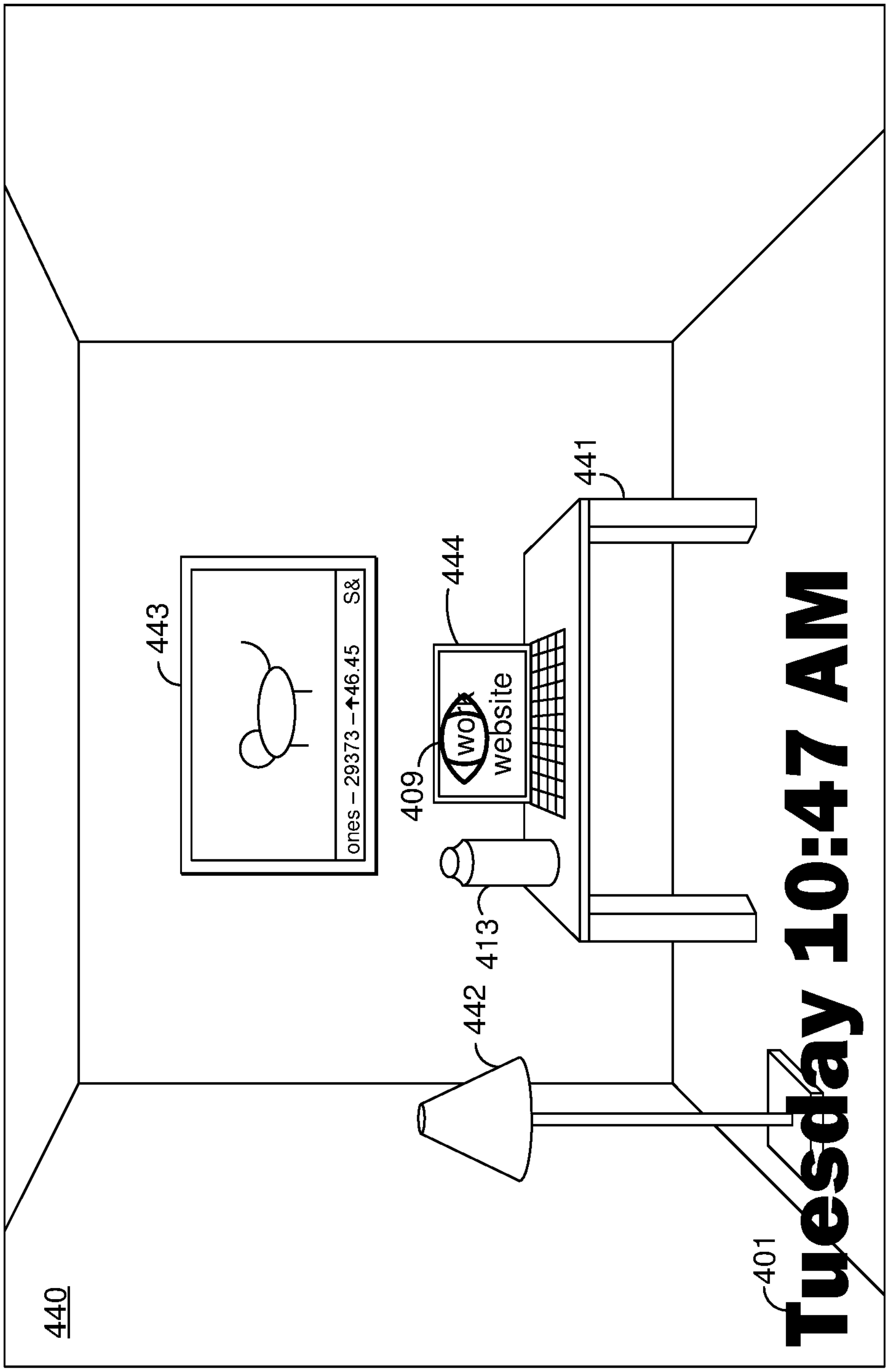
Figure 4U:
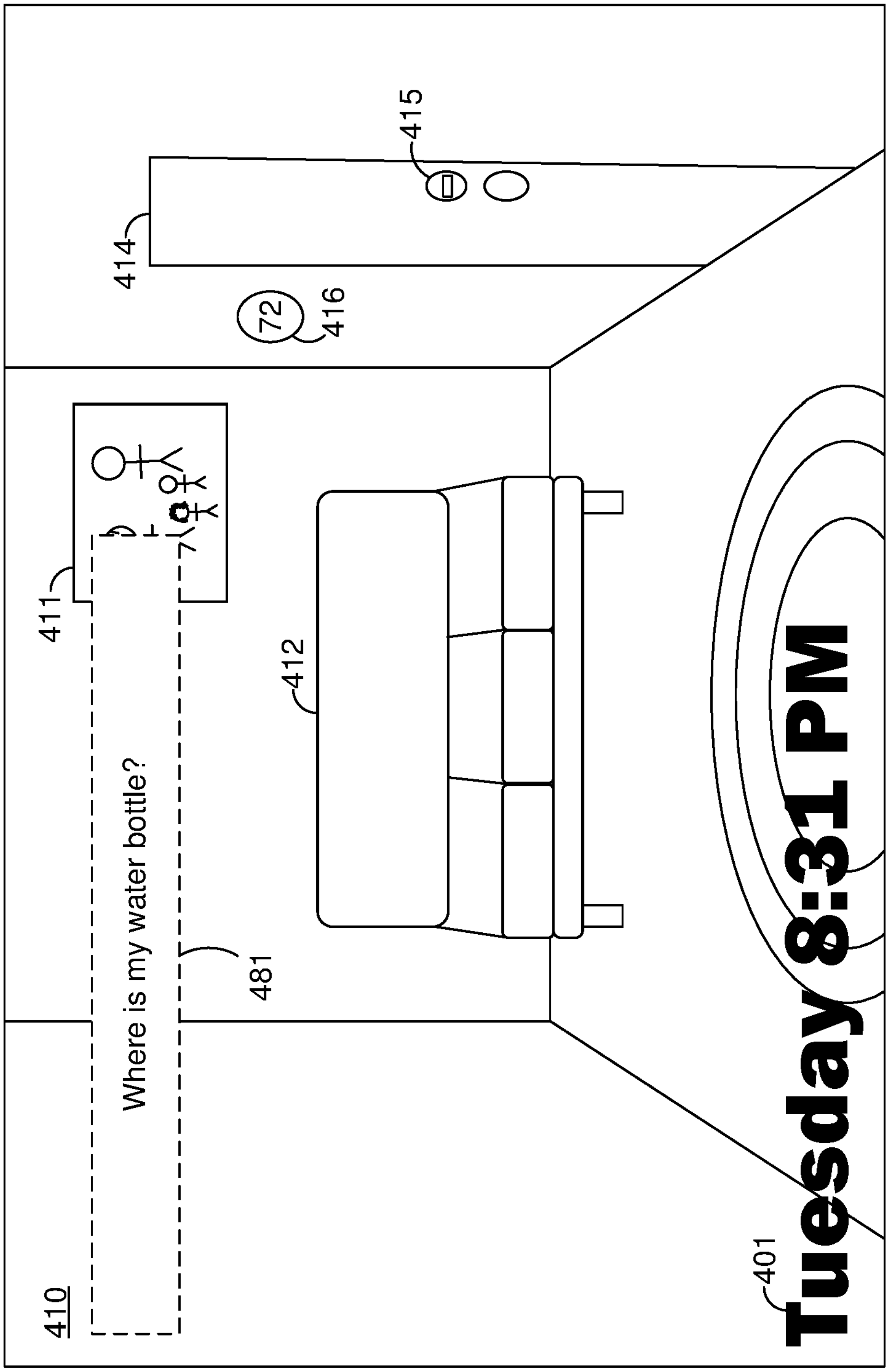
Figure 4V:
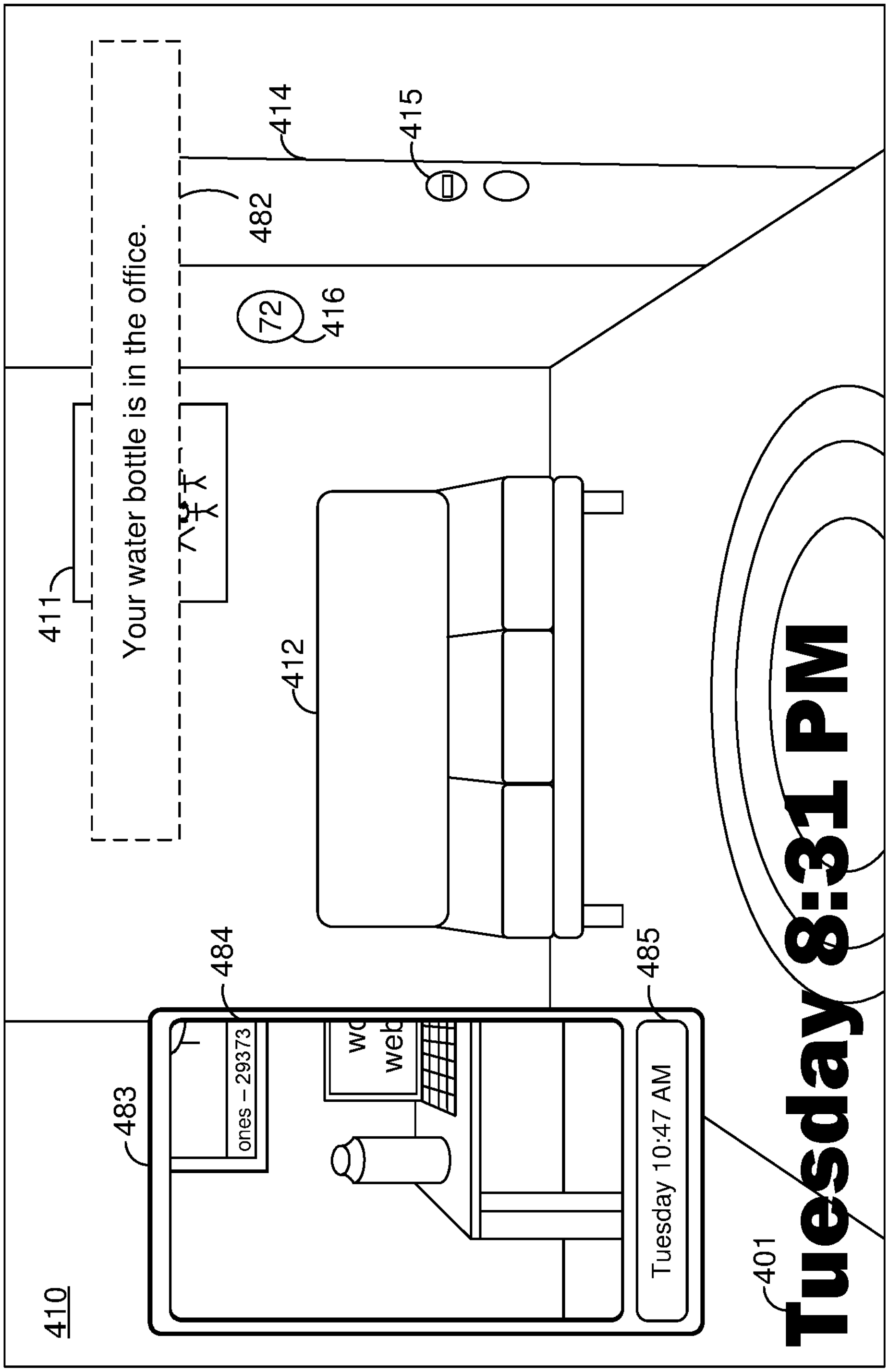
Figure 4W:
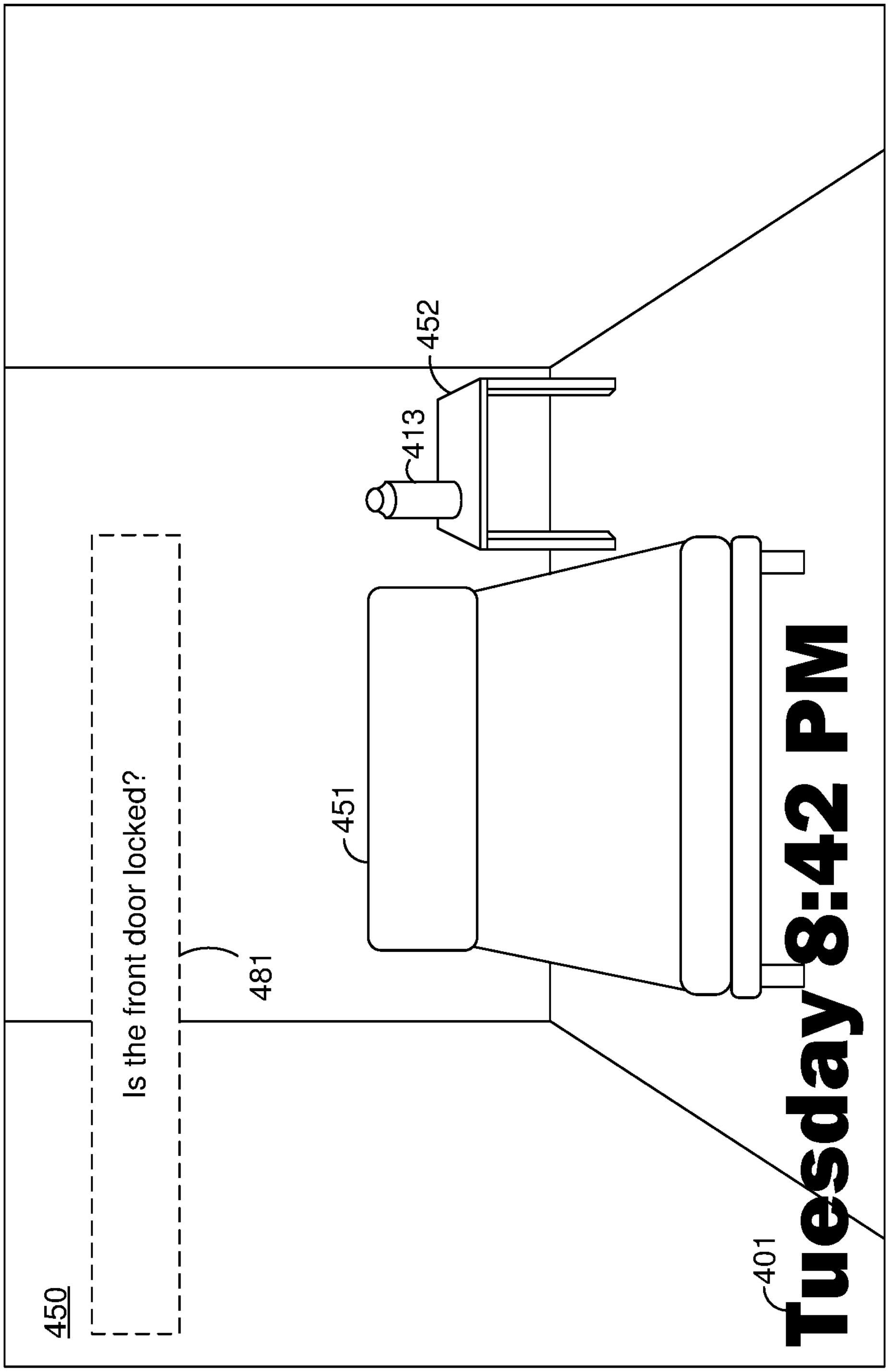
Figure 4X:
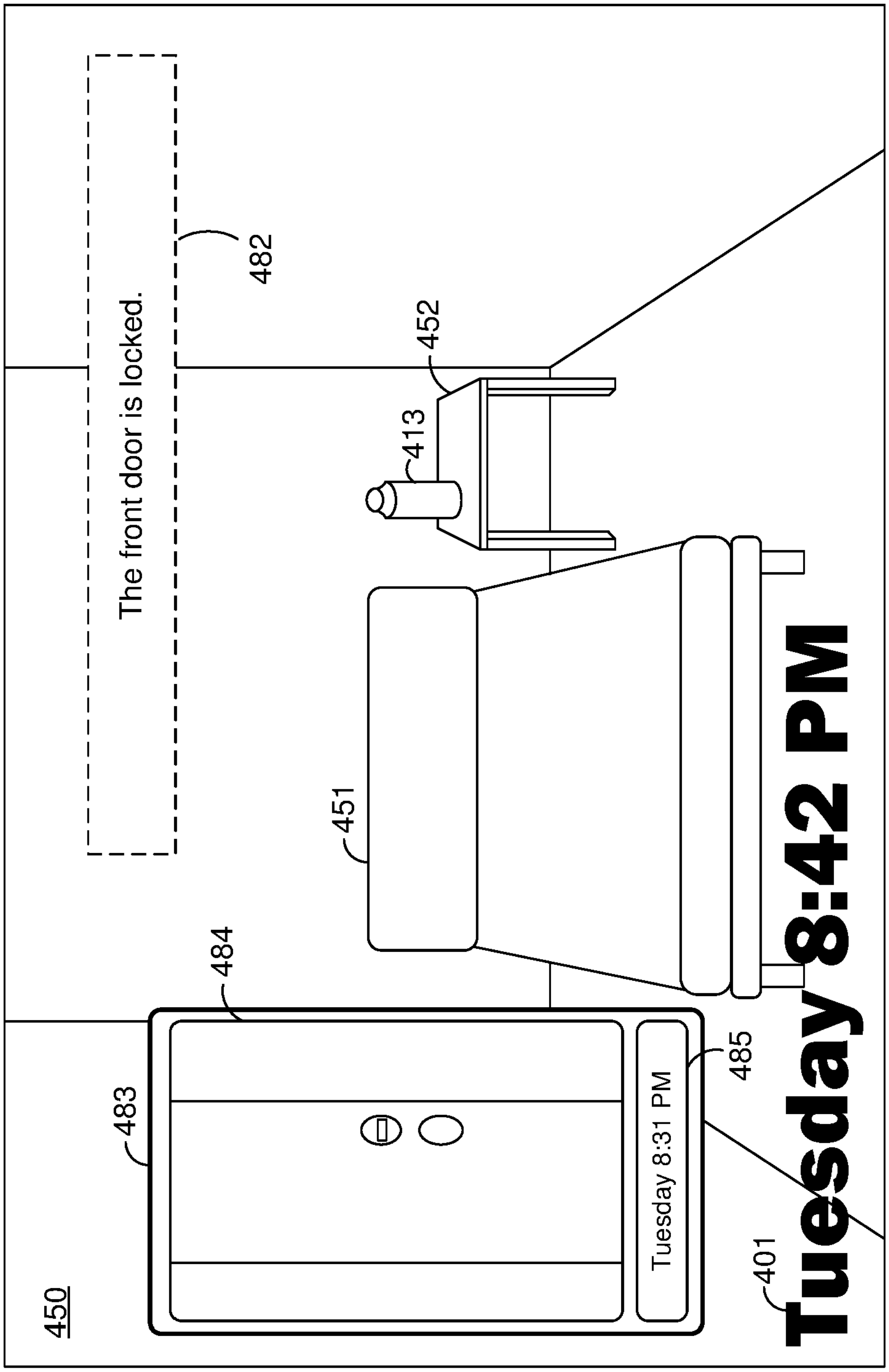
Figure 4Y:
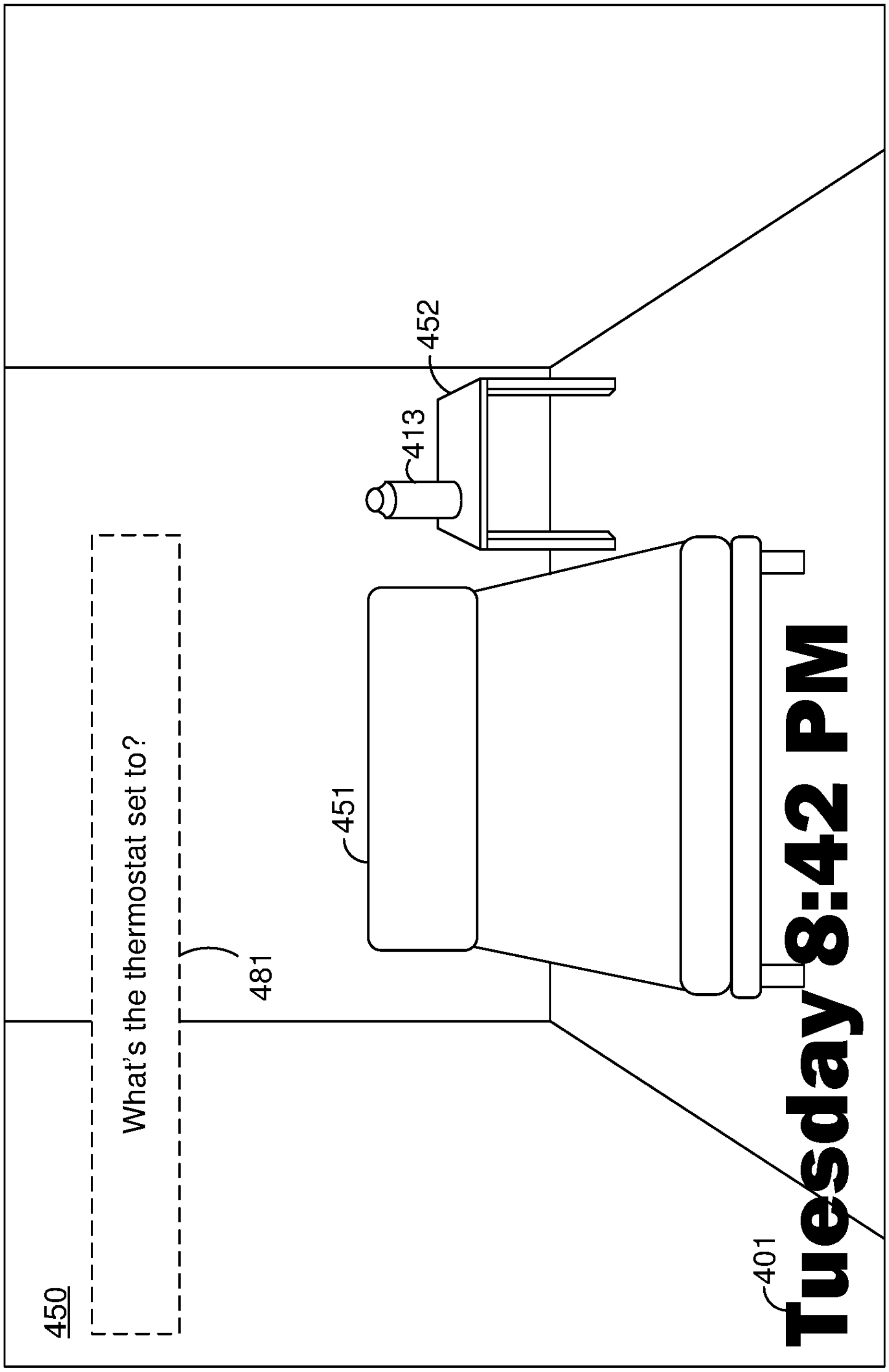
Figure 4Z:
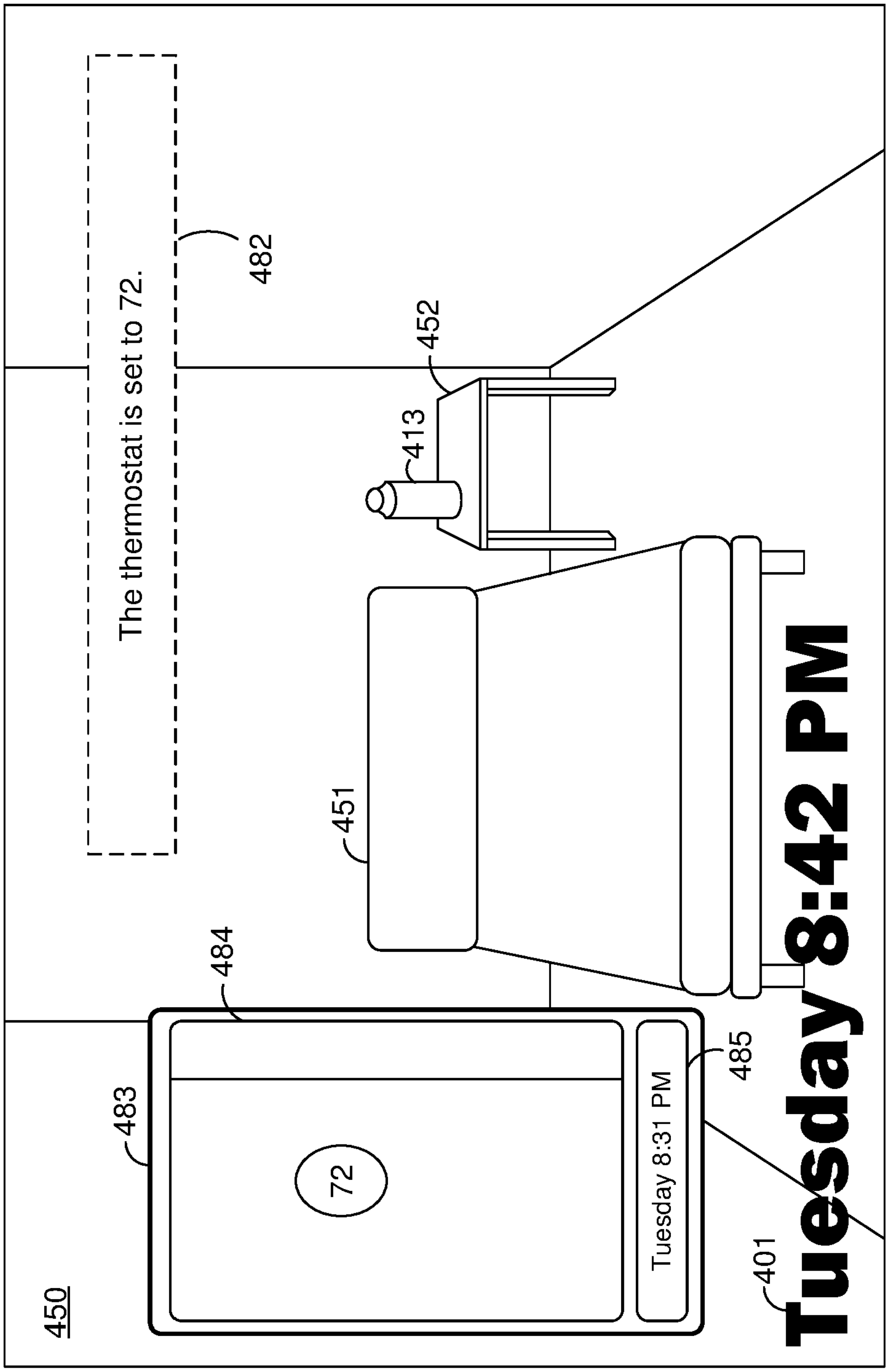

FIGS. 4A-4Z illustrate a number of XR environments presented, at least in part, by a display of an electronic device, such as the electronic device 120 of FIG. 3. Each XR environment is based on a physical environment in which the electronic device is present. FIGS. 4A-4Z illustrate the XR environments during a series of time periods. In various implementations, each time period is an instant, a fraction of a second, a few seconds, a few hours, a few days, or any length of time. In various implementations, the time between subsequent time periods is an instant, a fraction of a second, a few seconds, a few hours, a few days, or any length of time.

FIGS. 4A-4Z illustrate a gaze location indicator 409 that indicates a gaze location of the user, e.g., where in the respective XR environment the user is looking. Although the gaze location indicator 409 is illustrated in FIGS. 4A-4Z, in various implementations, the gaze location indicator is not displayed by the electronic device.

FIGS. 4A-4Z illustrate a right hand 408 of a user. To better illustrate interaction of the right hand 408 with virtual objects such as user interface elements, the right hand 408 is illustrated as transparent.

FIG. 4A illustrates a first XR environment 410 during a first time period. The first XR environment 410 is based on a physical environment of a living room in which the electronic device is present.

The first XR environment 410 includes a plurality of objects, including one or more physical objects (e.g., a picture 411, a couch 412, a water bottle 413, a door 414, a lock 415, and a thermostat 416) of the physical environment and one or more virtual objects (e.g., a virtual clock 401 and a virtual context tracking window 490). In various implementations, certain objects (such as the physical objects and the virtual context tracking window 490) are presented at a location in the first XR environment 410, e.g., at a location defined by three coordinates in a three-dimensional (3D) XR coordinate system such that while some objects may exist in the physical world and the others may not, a spatial relationship (e.g., distance or orientation) may be defined between them. Accordingly, when the electronic device moves in the first XR environment 410 (e.g., changes either position and/or orientation), the objects are moved on the display of the electronic device, but retain their location in the first XR environment 410. Such virtual objects that, in response to motion of the electronic device, move on the display, but retain their position in the first XR environment 410 are referred to as world-locked objects.

In various implementations, certain virtual objects (such as the virtual clock 401) are displayed at locations on the display such that when the electronic device moves in the first XR environment 410, the objects are stationary on the display on the electronic device. Such virtual objects that, in response to motion of the electronic device, retain their location on the display are referred to display-locked objects.

FIG. 4A illustrates the first XR environment 410 during a first time period. During the first time period, the virtual context tracking window 490 includes a list of current contexts 491A currently being tracked by the electronic device, an add affordance 491B for adding contexts to the list of current contexts 491A, and an edit affordance 491C for otherwise editing the list of current contexts 491A, e.g., removing contexts from the list of current contexts 491A.

During the first time period, the user selects the add affordance 491B. In various implementations, the user selects the add affordance 491B by performing a hand gesture (e.g., a pinch-and-release gesture) at the location of the add affordance 491B. In various implementations, the user selects the add affordance 491B by looking at the add affordance 491B and performing a head gesture, such as a nod, a wink, or blink, or an eye swipe (in which the gaze swipes across the add affordance 491B). In various implementations (as illustrated in FIG. 4A), the user selects the add affordance 491B by looking at the add affordance 491B and performing a hand gesture (e.g., a pinch-and-release gesture) in an empty portion of the field-of-view. Thus, in various implementations, the gaze indicator 409 corresponds to a mouse cursor and the pinch-and-release gesture performed by the right hand 408 corresponds to a mouse click.

Thus, in FIG. 4A, the gaze indicator 409 indicates that the user is looking at the add affordance 491B and the right hand 408 is performing a pinch-and-release gesture.

FIG. 4B illustrates the first XR environment 410 at a second time period subsequent to the first time period. During the second time period, the virtual context tracking window 490 includes a list of available contexts 492A that can be added to the list of current contexts 491A. In various implementations, each entry in the list of available contexts 492A is pre-programmed into the electronic device or is obtained by the electronic device from a remote server. The virtual context tracking window 490 includes a search bar 492B for searching the list of available contexts 492A or other available contexts not displayed (e.g., context definitions on a remote server). The virtual context tracking window 490 includes a custom affordance 492C for adding a custom context to the list of current contexts 491A. The virtual context tracking window includes a cancel affordance 492D for returning the virtual context tracking window to the state of FIG. 4A without adding any contexts to the list of current contexts 491A and a done affordance 492E for adding selected contexts to the list of current contexts 491A.

During the second time period, the user selects the "Brushing Teeth" entry in the list of available contexts 492A. Thus, in FIG. 4B, the gaze indicator 409 indicates that the user is looking at the "Brushing Teeth" entry and the right hand 408 is performing a pinch-and-release gesture.

FIG. 4C illustrates the first XR environment 410 during a third time period subsequent to the second time period. During the third time period, the "Brushing Teeth" entry of the list of available contexts 492A is selected and highlighted. During the third time period, the user selects the done affordance 492E for adding the "Brushing Teeth" context to the list of current contexts 491A. Thus, in FIG. 4C, the gaze indicator 409 indicates that the user is looking at the done affordance 492E and the right hand 408 is performing a pinch-and-release gesture.

FIG. 4D illustrates the first XR environment 410 during a fourth time period subsequent to the third time period. During the fourth time period, the virtual context tracking window 490 displays the list of current contexts 491A including a "Brushing Teeth" entry. During the fourth time period, the user selects the add affordance 491B. Thus, in FIG. 4D, the gaze indicator 409 indicates that the user is looking at the add affordance 491B and the right hand 408 is performing a pinch-and-release gesture.

FIG. 4E illustrates the first XR environment 410 during a fifth time period subsequent to the fourth time period. During the fifth time period, the virtual context tracking window 490 displays the list of available contexts 492A. During the fifth time period, the user selects the custom affordance 492C. Thus, in FIG. 4E, the gaze indicator 409 indicates that the user is looking at the custom affordance 492C and the right hand 408 is performing a pinch-and-release gesture.

FIG. 4F illustrates the first XR environment 410 during a sixth time period subsequent to the fifth time period. During the sixth time period, the virtual context tracking window 490 includes an object affordance 493A for adding an object context to the list of current contexts 491A. an activity affordance 493B for adding an activity context to the list of current contexts 491A, and a status affordance 493C for adding a status context to the list of current contexts 491A. The virtual context tracking window 490 further includes a cancel affordance 493D for returning the virtual context tracking window 490 to the state of FIG. 4E.

During the sixth time period, the user selects the object affordance 493A. Thus, in FIG. 4F, the gaze indicator 409 indicates that the user is looking at the object affordance 493A and the right hand 408 is performing a pinch-and-release gesture.

FIG. 4G illustrates the first XR environment 410 during a seventh time period subsequent to the sixth time period. Between the sixth time period and the seventh time period, the user provides (e.g., verbally in response to a prompt) a name of the object to be tracked, e.g., "Water Bottle". During the seventh time period, the virtual context tracking window 490 displays training instructions 494 instructing the user to position the object to be tracked in a reticle 495. Accordingly, during the seventh time period, the user has picked up the water bottle 413 with the right hand 408 and positioned the water bottle 413 within the reticle 495. In various implementations, the user moves the head and/or body of the user to position the object within the reticle 495 without moving the object. In various implementations, the electronic device captures images of the water bottle 413 and trains a neural network to detect the water bottle 413 in future images.

FIG. 4H illustrates the first XR environment 410 during an eighth time period subsequent to the seventh time period. During the eighth time period, the virtual context tracking window 490 displays the list of current contexts 491A including a "Water Bottle" entry.

During the eighth time period, the user selects the add affordance 491B. Thus, in FIG. 4H, the gaze indicator 409 indicates that the user is looking at the add affordance 491B and the right hand 408 is performing a pinch-and-release gesture.

FIG. 4I illustrates the first XR environment 410 during a ninth time period subsequent to the eighth time period. During the ninth time period, the virtual context tracking window 490 includes the list of available contexts 492A that can be added to the list of current contexts 491A and the custom affordance 492C.

During the ninth time period, the user selects the custom affordance 492C. Thus, in FIG. 4I, the gaze indicator 409 indicates that the user is looking at the custom affordance 492C and the right hand 408 is performing a pinch-and-release gesture.

FIG. 4J illustrates the first XR environment 410 during a tenth time period subsequent to the ninth time period. During the tenth time period, the virtual context tracking window 490 includes the object affordance 493A, the activity affordance 493B, and the status affordance 493C.

During the tenth time period, the user selects the status affordance 493C. Thus, in FIG. 4J, the gaze indicator 409 indicates that the user is looking at the status affordance 493C and the right hand 408 is performing a pinch-and-release gesture.

FIG. 4K illustrates the first XR environment 410 during an eleventh time period subsequent to the tenth time period. Between the tenth time period and the eleventh time period, the user provides (e.g., verbally in response to a prompt) a name of the object for which the status is to be tracked, e.g., "Lock", and the number and name of two or more statuses, e.g., "locked" and "unlocked". During the eleventh time period, the virtual context tracking window 490 displays training instructions 494 instructing the user to position the object with a first status in the reticle 495. Accordingly, during the eleventh time period, the user has moved the head and/or body of the user to position the lock 415 within the reticle 495. In various implementations, the electronic device captures images of the lock 415 with a locked status and trains a neural network to detect the lock 415 with a locked status in future images.

FIG. 4L illustrates the first XR environment 410 during a twelfth time period subsequent to the eleventh time period. During the twelfth time period, the virtual context tracking window 490 displays training instructions 494 instructing the user to position the object with a second status in the reticle 495. Accordingly, during the twelfth time period, the user has unlocked the lock 415. In various implementations, the electronic device captures images of the lock 415 with an unlocked status and trains a neural network to detect the lock 415 with an unlocked status in future images.

FIG. 4M illustrates the first XR environment 410 during a thirteenth time period subsequent to the twelfth time period. During the thirteenth time period, the virtual context tracking window 490 displays the list of current contexts 491A including a "Lock" entry.

During the thirteenth time period, the user selects the add affordance 491B. Thus, in FIG. 4M, the gaze indicator 409 indicates that the user is looking at the add affordance 491B and the right hand 408 is performing a pinch-and-release gesture.

FIG. 4N illustrates the first XR environment 410 during a fourteenth time period subsequent to the thirteenth time period. During the fourteenth time period, the virtual context tracking window 490 includes the list of available contexts 492A that can be added to the list of current contexts 491A and the custom affordance 492C.

During the fourteenth time period, the user selects the custom affordance 492C. Thus, in FIG. 4N, the gaze indicator 409 indicates that the user is looking at the custom affordance 492C and the right hand 408 is performing a pinch-and-release gesture.

FIG. 4O illustrates the first XR environment 410 during a fifteenth time period subsequent to the fourteenth time period. During the fifteenth time period, the virtual context tracking window 490 includes the object affordance 493A, the activity affordance 493B, and the status affordance 493C.

During the fifteenth time period, the user selects the status affordance 493C. Thus, in FIG. 4O, the gaze indicator 409 indicates that the user is looking at the status affordance 493C and the right hand 408 is performing a pinch-and-release gesture.

FIG. 4P illustrates the first XR environment 410 during a sixteenth time period subsequent to the fifteenth time period. Between the fifteenth time period and the sixteenth time period, the user provides (e.g., verbally in response to a prompt) a name of the object for which the status is to be tracked, e.g., "Thermostat", and an indication that the status to be tracked is displayed by the object. During the sixteenth time period, the virtual context tracking window 490 displays training instructions 494 instructing the user to position the object in the reticle 495. Accordingly, during the sixteenth time period, the user has moved the head and/or body of the user to position the thermostat 416 within the reticle 495. In various implementations, the electronic device captures images of the thermostat 416 and trains a neural network to detect the thermostat 416 in future images. The electronic device also performs text recognition on the text displayed by the thermostat (e.g., "70") to determine the status of the thermostat 416.

FIG. 4Q illustrates the first XR environment 410 during a seventeenth time period subsequent to the sixteenth time period. During the seventeenth time period, the virtual context tracking window 490 displays the list of current contexts 491A including a "Thermostat" entry.

FIG. 4R illustrates a second XR environment 420 during a eighteenth time period subsequent to the seventeenth time period. The second XR environment 420 is based on an outdoor physical environment in which the electronic device is present.

The second XR environment 420 includes a plurality of objects, including one or more physical objects (e.g., a sidewalk 421, a street 422, a tree 423, and a dog 424) of the physical environment and one or more virtual objects (e.g., the virtual clock 401, a virtual running application window 428, and a virtual mile marker 429). The virtual mile marker 429 is a world-locked virtual object. In various implementations, the location in the second XR environment 420 of certain virtual objects (such as the virtual running application window 428) changes based on the pose of the body of the user. Such virtual objects are referred to as body-locked objects. For example, as the user runs, the virtual running application window 428 maintains a location approximately one meter in front and half a meter to the left of the user (e.g., relative to the position and orientation of the user's torso). As the head of the user moves, without the body of the user moving, the virtual running application window 428 appears at a fixed location in the second XR environment 420. The second XR environment 420 further includes the water bottle 413.

During the eighteenth time period, the user is running along the sidewalk 421 and carrying the water bottle 413 in the right hand 408 of the user. The electronic device detects the water bottle 413 in an image of the outdoor physical environment on which the second XR environment 420 is based and stores, in a database, an entry including an indication that the water bottle 413 was detected in association with an indication of the time at which the water bottle 413 was detected, e.g., Tuesday at 8:34 AM. In various implementations, the entry further includes an indication of a location of the electronic device when the water bottle 413 was detected. In various implementations, the entry further includes at least a portion of the image of the outdoor physical environment in which the water bottle 413 was detected.

FIG. 4S illustrates a third XR environment 430 during a nineteenth time period subsequent to the eighteenth time period. The third XR environment 430 is based on a physical environment of a bathroom in which the electronic device is present.

The third XR environment 430 includes a plurality of objects, including one or more physical objects (e.g., a mirror 431, a sink 432, and a toothbrush 433) of the physical environment and one or more virtual objects (e.g., the virtual clock 401 and a virtual timer 435). The virtual timer 435 is a body-locked virtual object.

During the nineteenth time period, the user is brushing the user's teeth with the toothbrush 433 held in the right hand 408 of the user. The electronic device detects that the user is brushing the user's teeth. In various implementations, the electronic device detects that the user is brushing the user's teeth based on captured images of the third XR environment 430 (e.g., the presence of the toothbrush 433), sound detected in the third XR environment 430 (e.g., the sound of running water or brushing), and/or motion of the electronic device within the third XR environment 430 (e.g., a back-and-forth caused by a brushing motion). In response to detecting the context of teeth-brushing, the electronic device stores, in a database, an entry including an indication that teeth-brushing was detected in association with an indication of the time at which teeth-brushing was detected, e.g., Tuesday at 9:15 AM. In various implementations, the entry further includes an indication of a location of the electronic device when teeth-brushing was detected. In various implementations, the entry further includes at least a portion of the image of the physical environment of the bathroom while teeth-brushing was detected.

FIG. 4T illustrates a fourth XR environment 440 during a twentieth time period subsequent to the nineteenth time period. The fourth XR environment 440 is based on a physical environment of an office in which the electronic device is present.

The fourth XR environment 440 includes a plurality of objects, including one or more physical objects (e.g., a desk 441, a lamp 442, a television 443, and a laptop 444) of the physical environment and one or more virtual objects (e.g., the virtual clock 401). The fourth XR environment 440 further includes the water bottle 413 on the desk 441.

The electronic device detects the water bottle 413 in an image of the physical environment of the office on which the fourth XR environment 440 is based and stores, in a database, an entry including an indication that the water bottle 413 was detected in association with an indication of the time at which the water bottle 413 was detected, e.g., Tuesday at 10:47 AM. In various implementations, the entry further includes an indication of a location of the electronic device when the water bottle 413 was detected. In various implementations, the entry further includes at least a portion of the image of the outdoor physical environment in which the water bottle 413 was detected.

FIG. 4U illustrates the first XR environment 410 during a twenty-first time period subsequent to the twentieth time period. During the twenty-first time period, the first XR environment 410 includes a query indicator 481. The query indicator 481 is a display-locked virtual object displayed by the electronic device in response to a vocal query from the user. For example, during the twenty-first time period, the user has vocally asked "Where is my water bottle?" Although FIG. 4U illustrates the query indicator 481 as a display-locked virtual object, in various implementations, the query indicator 481 is not displayed.

The electronic device detects the lock 415 with a locked status in an image of the physical environment of the living room on which the first XR environment 410 is based and stores, in a database, an entry including an indication that the lock 415 with the locked status was detected in association with an indication of the time at which the lock 415 with the locked status was detected, e.g., Tuesday at 8:31 PM. In various implementations, the entry further includes at least a portion of the image of the living room physical environment in which the lock 415 with the locked status was detected.

The electronic device detects the thermostat 416 in an image of the physical environment of the living room on which the first XR environment 410 is based. Performing text recognition on the image, the electronic device determines a status of the thermostat 416, e.g., "72". The electronic device stores, in a database, an entry including an indication that the thermostat 416 with a status of "72" was detected in association with an indication of the time at which the thermostat with the status of "72" was detected, e.g., Tuesday at 8:31 PM. In various implementations, the entry further includes at least a portion of the image of the living room physical environment in which the thermostat 416 with the status of "72" was detected.

FIG. 4V illustrates the first XR environment 410 at a twenty-second time period subsequent to the twenty-first time period. In various implementations, the indications of context detection stored in association with indications of the respective times of context detection are stored in a searchable database. In response to the vocal query, the electronic device searches the database to generate a response. For example, in response to the vocal query of "Where is my water bottle?", the electronic device searches the database for the latest entry indicating detection of the water bottle 413. Thus, continuing the example, to generate a response to vocal query, the electronic device retrieves the most recent entry indicating detection of the water bottle 413 and also indicating a time at which the water bottle 413 was detected. In various implementations, the response indicates the time at which the water bottle 413 was detected, e.g., "Tuesday at 10:47 AM". From this information, the user can deduce that the water bottle 413 is in the physical environment of the office of FIG. 4T. In various implementations, the most recent entry indicating detection of the water bottle 413 further indicates a location of the electronic device at the time at which the water bottle 413 was detected, e.g., the physical environment of the office.

During the twenty-second time period, the query indicator 481 is replaced with a response indicator 482. The response indicator 482 is a display-locked virtual object displayed by the electronic device while an audio response to the vocal query is produced by the device. For example, during the twenty-second time period, the electronic device produces the sound of a voice saying "Your water bottle is in the office." Although FIG. 4V illustrates the response indicator 482 as a display-locked virtual object, in various implementations, the response indicator 482 is not displayed while the audio response is produced by the device.

In various implementations, the entry indicating detection of the water bottle 413 further includes at least a portion of the image of the physical environment of the office in which the water bottle 413 was detected. Accordingly, during the twenty-second time period, the first XR environment 410 includes a response window 483 including information from the retrieved entry. For example, in FIG. 4V, the response window 483 includes an image 484 of the water bottle 413 captured during the twentieth time period of FIG. 4T and a time 485 the image 484 was captured. Thus, by viewing the response window 483, a user can confirm that the information in the response is correct or better locate a lost object.

FIG. 4W illustrates a fifth XR environment 450 during a twenty-third time period subsequent to the twenty-second time period. The fifth XR environment 450 is based on a physical environment of a bedroom in which the electronic device is present.

The fifth XR environment 450 includes a plurality of objects, including one or more physical objects (e.g., a bed 451 and a table 452) of the physical environment and one or more virtual objects (e.g., the virtual clock 401). The fifth XR environment 450 further includes the water bottle 413 on the table 452.

The electronic device detects the water bottle 413 in an image of the physical environment of the bedroom on which the fifth XR environment 450 is based and stores, in a database, an entry including an indication that the water bottle 413 was detected in association with an indication of the time at which the water bottle 413 was detected, e.g., Tuesday at 8:42 PM. In various implementations, the entry further includes an indication of a location of the electronic device when the water bottle 413 was detected. In various implementations, the entry further includes at least a portion of the image of the bedroom physical environment in which the water bottle 413 was detected.

During the twenty-third time period, the fifth XR environment 450 includes the query indicator 481. For example, during the twenty-third time period, the user has vocally asked "Is the front door locked?"

FIG. 4X illustrates the fifth XR environment 450 at a twenty-fourth time period subsequent to the twenty-third time period. In various implementations, the indications of context detection stored in association with indications of the respective times of context detection are stored in a searchable database. In response to the vocal query, the electronic device searches the database to generate a response. For example, in response to the vocal query of "Is the front door locked?", the electronic device searches the database for the latest entry indicating detection of the lock 415. Thus, continuing the example, to generate a response to vocal query, the electronic device retrieves the most recent entry indicating detection of the lock 415 and also indicating the status of the lock 415.

During the twenty-fourth time period, the query indicator 481 is replaced with the response indicator 482. For example, during the twenty-fourth time period, the electronic device produces the sound of a voice saying "The front door is locked."

In various implementations, the entry indicating detection of the lock 415 with the locked status further includes at least a portion of the image of the physical environment of the living room in which the lock 415 was detected. Accordingly, during the twenty-fourth time period, the fifth XR environment 450 includes the response window 483 including information from the retrieved entry. For example, in FIG. 4X, the response window 483 includes an image 484 of the lock 415 captured during the twenty-first time period of FIG. 4U and a time 485 the image 484 was captured. Thus, by viewing the response window 483, a user can confirm that the information in the response, e.g., the status, is correct. In various implementations, the response to vocal query includes the time, e.g., "The front door was locked at 8:31 PM." Thus, based on the amount of time elapsed since the time given in the response, the user can be more or less confident in the accuracy of the status.

FIG. 4Y illustrates the fifth XR environment 450 during a twenty-fifth time period subsequent to the twenty-fourth time period. During the twenty-fifth time period, the fifth XR environment 450 includes the query indicator 481. For example, during the twenty-fifth time period, the user has vocally asked "What's the thermostat set to?"

FIG. 4Z illustrates the fifth XR environment 450 at a twenty-sixth time period subsequent to the twenty-fifth time period. In various implementations, the indications of context detection stored in association with indications of the respective times of context detection are stored in a searchable database. In response to the vocal query, the electronic device searches the database to generate a response. For example, in response to the vocal query of "What's the thermostat set to?", the electronic device searches the database for the latest entry indicating detection of the thermostat 416. Thus, continuing the example, to generate a response to vocal query, the electronic device retrieves the most recent entry indicating detection of the thermostat 416 and also indicating the status of the thermostat 416.

During the twenty-sixth time period, the query indicator 481 is replaced with the response indicator 482. For example, during the twenty-sixth time period, the electronic device produces the sound of a voice saying "The thermostat is set to 72."

In various implementations, the entry indicating detection of the thermostat 416 with the status of "72" further includes at least a portion of the image of the physical environment of the living room in which the thermostat 416 was detected. Accordingly, during the twenty-sixth time period, the fifth XR environment 450 includes the response window 483 including information from the retrieved entry. For example, in FIG. 4Z, the response window 483 includes an image 484 of the thermostat captured during the twenty-first time period of FIG. 4U and a time 485 the image 484 was captured. Thus, by viewing the response window 483, a user can confirm that the information in the response, e.g., the status, is correct.

Whereas FIGS. 4U-4Z illustrate example queries and responses, in various implementations, the electronic device can generate a variety of different responses to answer various queries. For example, in various implementations, the query is "Did I brush my teeth this morning?" To generate the response, the electronic device searches the database for entries including indications of detection of teeth-brushing and determines if any of the entries include an indication of a time within this morning. Thus, continuing the example, to generate a response to vocal query, the electronic device retrieves the entry including an indication of detection of teeth-brushing during the nineteenth time period (e.g., Tuesday at 9:15 AM) to generate the response. For example, in various implementations, the response is "You brushed your teeth at 9:15 this morning."

As another example, in various implementations, the query is "How many times did I wash my hands today?" To generate the response, the electronic device searches the database for entries including indications of detection of hand-washing and indications of respective times within the current day. Thus, continuing the example, to generate a response to vocal query, the electronic device counts the number of such entries to generate the response. For example, in various implementations, the response is "You washed your hands five times today."

Figure 5:
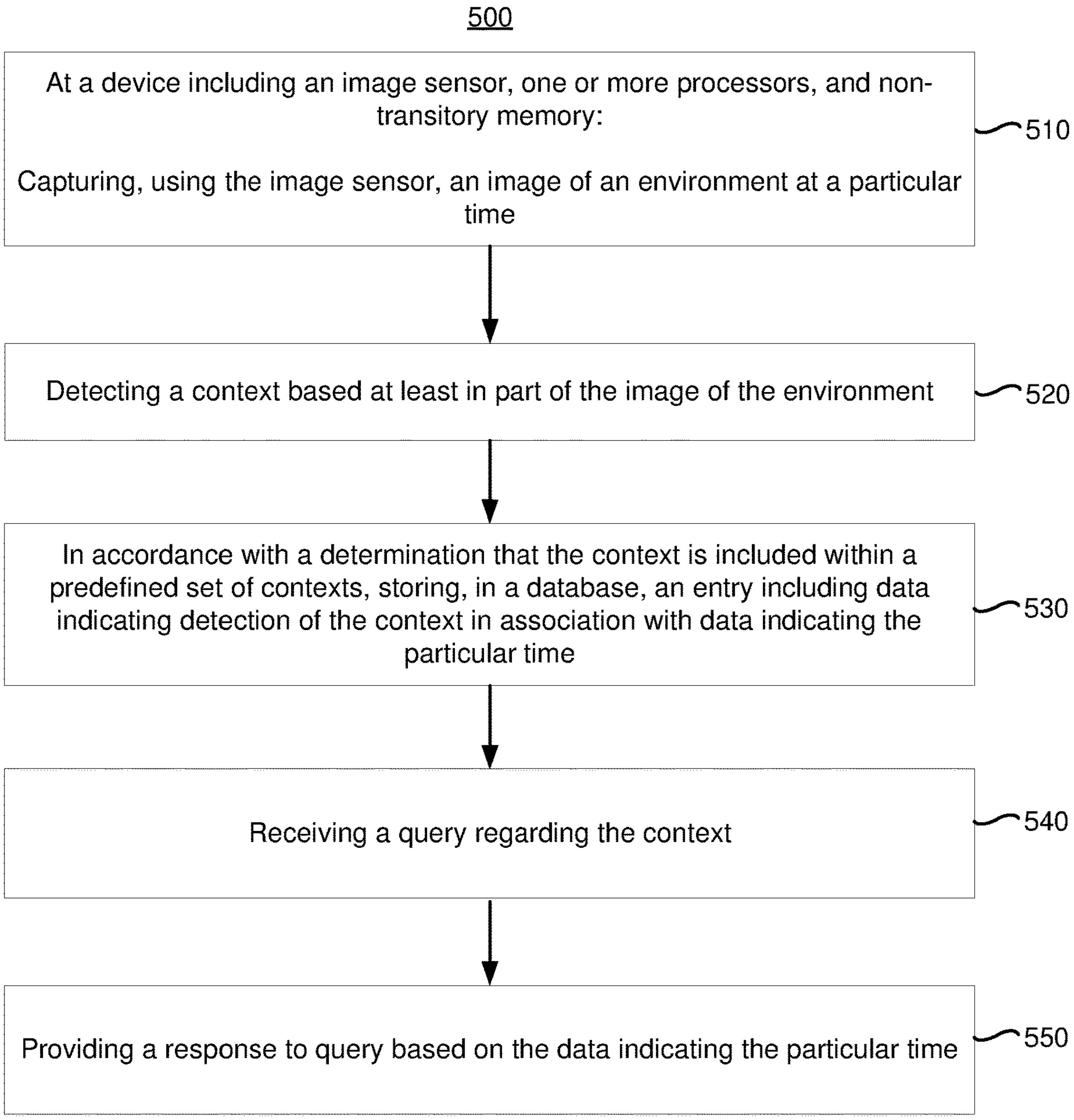
FIG. 5 is a flowchart representation of a method of tracking contexts in accordance with some implementations.

FIG. 5 is a flowchart representation of a method 500 of tracking contexts in accordance with some implementations. In various implementations, the method 500 is performed by a device including an image sensor, one or more processors, and non-transitory memory (e.g., the electronic device 120 of FIG. 3). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device capturing, using the image sensor, an image of an environment at a particular time. For example, in FIG. 4R, the electronic device captures an image of the outdoor physical environment on which the second XR environment 420 is based. As another example, in FIG. 4S, the electronic device captures an image of the physical environment of the bathroom on which the third XR environment 430 is based.

The method 500 continues, in block 520, with the device detecting a context based at least in part on the image of the environment. In various implementations, detecting the context includes detecting a physical object present in the environment (e.g., using an object detection model or neural network classifier configured to classify images of various objects as one of various object types or subtypes). For example, in FIG. 4R, the electronic device detects the water bottle 413 based at least in part on the image of the outdoor physical environment. In various implementations, detecting the context includes detecting an activity performed in the environment. For example, in FIG. 4S, the electronic device detects teeth-brushing based at least in part on the image of the physical environment of the bathroom. In various implementations, detecting the context is further based on at least one of sound in the environment at the particular time or motion of the device at the particular time. For example, in FIG. 4S, the electronic device detects teeth-brushing based on the sound of water running in the physical environment of the bathroom and motion of the device due to brushing. As another example, in various implementations the electronic device detects eating based on an image of the environment in which food is detected in addition to the sound and device motion caused by the user chewing. In various implementations, detecting the context includes detecting a status of an object. For example, in FIG. 4U, the electronic device detects the lock 415 having a locked status based at least in part on the image of the living room physical environment. As another example, in FIG. 4U, the electronic device detects the thermostat 416 having a status of "72" based at least in part on the image of the living room physical environment. In various implementations, determining the status of an object includes perform text recognition on text displayed by the object. For example, in FIG. 4U, the electronic device determines the thermostat 416 has a status of "72" based on performing text recognition on text displayed by the thermostat 416.

The method 500 continues, in block 530, with the device, in accordance with a determination that the context is included within a predefined set of contexts, storing, in a database, an entry including data indicating detection of the context in association with data indicating the particular time. In various implementations, the database is stored on the device, e.g., the non-transitory memory. In various implementations, the database is stored on a server remote from the device.

In various implementations, the predefined set of contexts includes contexts which are registered by a user via, e.g., a graphical user interface. For example, in FIGS. 4A-4Q, the user registers the contexts of teeth-brushing, the water bottle 413, the status of the lock 415, and the status of the thermostat 416. Accordingly, in various implementations, the method 500 includes receiving user input indicative of registration of the context, the registration causing the context to be included within the predefined set of contexts. In various implementations, the user input indicative of registration of the context includes selection of a pre-programmed context. For example, in FIGS. 4A-4D, the user provides user input to register the context of teeth-brushing by selecting the "Brushing Teeth" entry in the list of available contexts 492A. In various implementations, the user input indicative of registration of the context includes demonstration of the context. For example, in FIGS. 4D-4H, the user provides user input to register the context of the water bottle 413 by allowing the electronic device to capture images of the water bottle 413. In various implementations, demonstration of the context includes exhibiting an object to the image sensor. In various implementations, demonstration of the context includes performing an activity.

In various implementations, the entry further includes data indicating a location of the device at the particular time. In various implementations, the location of the device is represented by latitude and longitude coordinates, e.g., as determined by a GPS sensor. In various implementations, the location of the device is an address or the name of a business at that address. For example, in FIG. 4T, the electronic device detects the water bottle 413 and includes a location of "office" in the entry in the database.

In various implementations, the entry further includes at least a portion of the image of the environment at the particular time. For example, in FIG. 4T, the electronic device detects the water bottle 413 and includes at least a portion of the image of the physical environment of the office in the entry in the database. The portion of the image is illustrated as the image 484 in the response window 483 of FIG. 4V.

In various implementations, the database is queryable or searchable. Thus, the method 500 continues, in block 540, with the device receiving a query regarding the content and further continues, in block 550, with the device providing a response to query based on the data indicating the particular time.

In various implementation, the query is received from a user. In various implementations, the query received from the user is a verbal query including one or more words. In various implementations, the query received from the user is a vocal query. For example, in FIG. 4U, the electronic device receives the vocal query "Where is my water bottle?" as indicated by the query indicator 481. In various implementations, the query is received from an application. For example, in various implementations, the context is the user taking a medication. A medical application can query the database to determine if the user has taken required medication (e.g., the user has forgotten to take a daily antidepressant), if the user is taking medication too frequently (e.g., the user is taking too pain medication too often), or if the amount of medication the user is taking is changing over time (e.g., the user's use of a rescue inhaler is becoming more frequent). Based on the results, the application may provide feedback to the user, such as a virtual notification window, without a user query.

In various implementations, providing the response includes providing a verbal response including one or more words. In various implementations, providing the response includes providing an audio response. For example, in FIG. 4V, in addition to displaying the response indicator 482, the electronic device produces the sound of a voice saying "Your water bottle is in the office." In various implementations, providing the response includes displaying a response window including at least a portion of the image of the environment at the particular time. For example, in FIG. 4V, the electronic device displays the response window 483 including the image 484.

In various implementations, the response indicates a latest time the context was detected. For example, in various implementations, the query is "Did I brush my teeth this morning" and the response indicates the last time teeth-brushing was detected. In various implementations, the query is "When did I last take my medicine?" and the response indicates the last time medicine-taking was detected. In various implementations, the query is "When was the last time I went for a run?" and the response indicates the last time running was detected.

In various implementations, the response indicates a location of the device at a latest time the context was detected. For example, in various implementations, the query is "Where is my water bottle?" and the response indicates the location of the device at the last time the water bottle 413 was detected. As another example, in various implementations, the query is "Where did I leave my keys?" and the response indicates the location of the device at the last time the keys of the user were detected. As another example, in various implementations, the query is "Where did I eat breakfast this morning?" and the response indicates a location of the device at the last time eating was detected.

In various implementations, the response indicates a number of times the context was detected within a time window. For example, in various implementations, the query is "How many times have I washed my hands today?" and the response indicates the number of times hand-washing was detected in the current day. As another example, in various implementations, the query is "How many dogs have I seen this week?" and the response indicates the number of times a dog was detected in the current week.

In various implementations, the device detects the context multiple times and stores an entry in the database for each time the context is detected. Thus, in various implementations, the method 500 includes capturing, using the image sensor, a second image of a second environment at a second particular time. In various implementations, the second environment is different than the environment. In various implementations, the second environment is the same as the environment. The method 500 includes detecting the context based at least in part on the second image of the environment and storing, in the database, a second entry including data indicating detection of the context in association with data indicating the second particular time. In various implementations, providing a response to the query is based on the data indicating the second particular time (and the particular time). For example, as noted above, in various implementations, the response indicates a number of times the context was detected in a time window.

In various implementations, the device detects multiple different contexts and stores an entry in the database for each time any context is detected. Thus, in various implementations, the method 500 includes capturing, using the image sensor, a second image of a second environment at a second particular time. The method 500 includes detecting a second context based at least in part on the second image of the second environment, wherein the second context is different than the first context. The method 500 includes, in accordance with a determination that the second context is included within the predefined set of contexts, storing, in the database, a second entry including data indicating detection of the second context in association with data indicating the second particular time. In various implementations, the method includes receiving, from a user, a second query regarding the second context and providing a response to the second query based on data indicating the second particular time.

In various implementations, the device attempts to detect contexts in each captured image of the environment. However, in various implementations, to reduce processing power expenditure in attempting to detect contexts in each captured image, the device attempts to detect contexts periodically in a subset of the images (e.g., once a second or once a minute). In various implementations, detecting the context (in block 520) is performed in response to determining that a function of the image of the environment breaches an interest threshold. In various implementations, the function of the image of the environment includes a difference between the image of the environment and a baseline image of the environment previously captured. If the function of the image of the environment is greater than the interest threshold, the device detects contexts in the image and sets the image of the environment as the baseline image of the environment. If the function of the image of the environment is less than the interest threshold, the device forgoes detecting contexts in the image. In various implementations, the function of the image of the environment is greater if the user's hands are detected in the image, indicating user interaction and a greater likelihood that an activity context will be detected.

Figure 6:
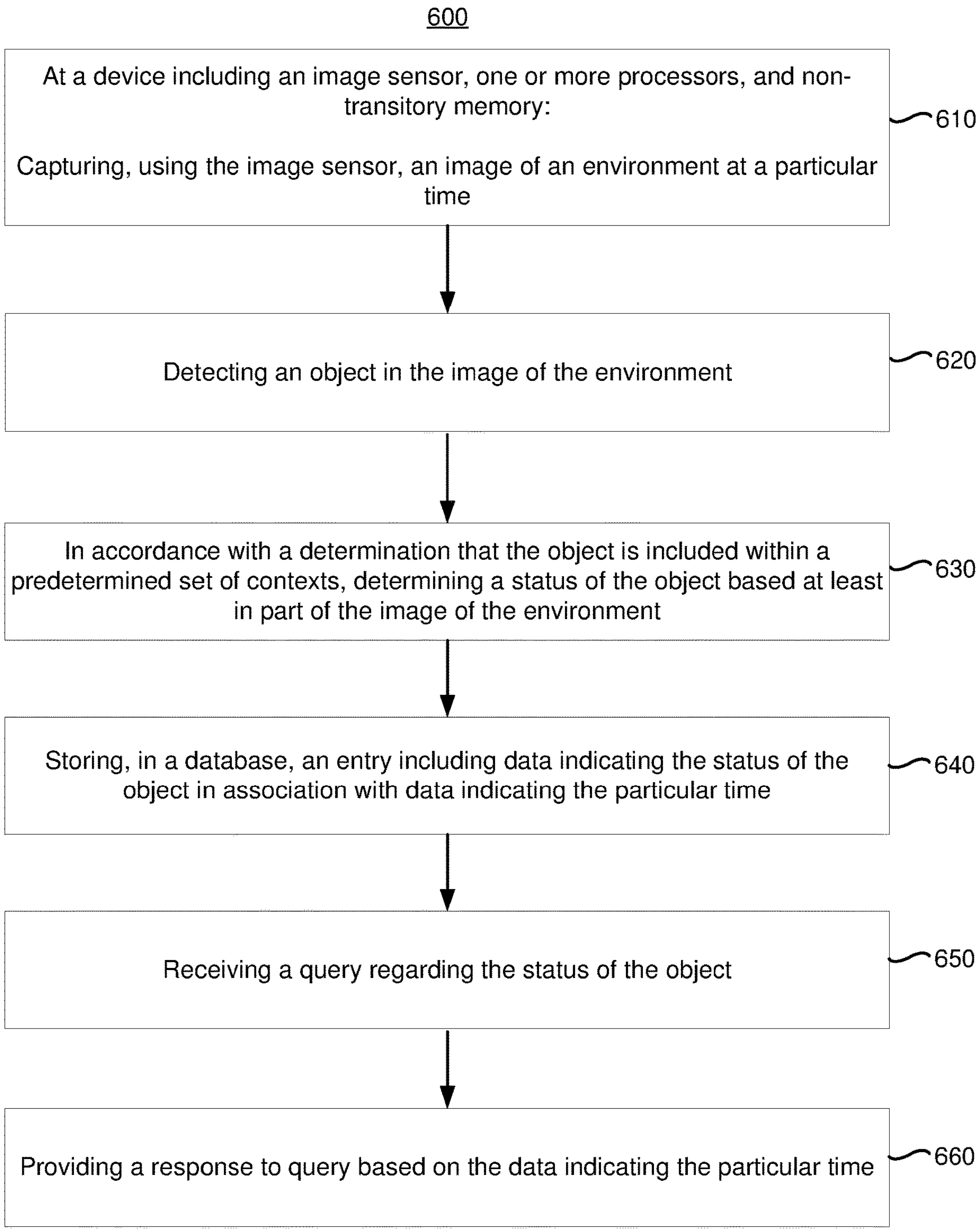
FIG. 6 is a flowchart representation of a method of tracking statuses of objects in accordance with some implementations.

FIG. 6 is a flowchart representation of a method 600 of tracking statuses of objects in accordance with some implementations. In various implementations, the method 600 is performed by a device including an image sensor, one or more processors, and non-transitory memory (e.g., the electronic device 120 of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device capturing, using the image sensor, an image of an environment at a particular time. For example, in FIG. 4U, the electronic device captures an image of the living room physical environment on which the first XR environment 410 is based.

The method 600 continues, in block 620, with the device detecting an object in the image of the environment. For example, in FIG. 4U, the electronic device detects the lock 415 in the image of the environment. As another example, in FIG. 4U, the electronic device detects the thermostat 416 in the image of the environment.

The method 600 continues, in block 630, with the device, in accordance with a determination that the object is included within a predefined set of objects, determining a status of the object based at least in part on the image of the environment. For example, in FIG. 4U, the electronic device determines that the lock 415 has a locked status based on the image of the environment. As another example, in FIG. 4U, the electronic device determines that the thermostat 416 has a status of "72" based on the image of the environment.

In various implementations, determining the status of the object includes applying a classifier to at least a portion of the image of the environment including the object. For example, in FIG. 4U, the electronic device determines the status of the lock 415 based on a classifier trained on the lock 415 with a locked status (in FIG. 4K) and an unlocked status (in FIG. 4L). In various implementations, determining the status of the object includes determining the status from two potential statuses. In various implementations, the potential statuses are predefined. For example, in various implementations, determining the status of the object includes determining whether the object is on or off. For example, the object may be a light (or light switch) or an oven. As another example, in various implementations, determining the status of the object includes determining whether the object is locked or unlocked. For example, the object may be a door (or lock).

In various implementations, determining the status of the object includes performing text recognition on text displayed by the object. For example, in FIG. 4U, the electronic device determines the status of the thermostat 416 by performing text recognition on the text reading "72" displayed by the thermostat 416. As another example, in various implementations, the object is an oven and the status is a temperature at which the oven is set (as displayed on a panel of the oven).

The method 600 continues, in block 640, with the device storing, in a database, an entry including data indicating the status of the object in association with data indicating the particular time. In various implementations, the database is stored on the device, e.g., the non-transitory memory. In various implementations, the database is stored on a server remote from the device.

In various implementations, predefined set of objects includes objects registered by a user via, e.g., a graphical user interface. For example, in FIGS. 4H-4Q, the user registers the status of the lock 415 and the status of the thermostat 416. Accordingly, in various implementations, the method 600 includes receiving user input indicative of registration of the object, the registration causing the object to be included within the predefined set of objects. In various implementations, the user input indicative of registration of the context includes demonstration of the object having a plurality of statuses. For example, in FIGS. 4K-4L, the user provides user input to register the status of the lock 415 by allowing the electronic device to capture images of the lock 415 having a locked status and an unlocked status. In various implementations, the user input indicative of registration of the object includes an indication of a location on the object at which text is displayed. Thus, in various implementations, a user demonstrates which portion of an object displays the status to be tracked.

In various implementations, the entry further includes at least a portion of the image of the environment at the particular time. For example, in FIG. 4U, the electronic device detects the lock 415 and includes at least a portion of the image of the physical environment of the living room environment in the entry in the database. The portion of the image is illustrated as the image 484 in the response window 483 of FIG. 4X.

In various implementations, the database is queryable or searchable. Thus, the method 600 continues, in block 650, with the device receiving a query regarding the status of the object and further continues, in block 660, with the device providing a response to query based on the data indicating the particular time.

In various implementation, the query is received from a user. In various implementations, the query received from the user is a verbal query including one or more words. In various implementations, the query received from the user is a vocal query. For example, in FIG. 4W, the electronic device receives the vocal query "Is the front door locked?" as indicated by the query indicator 481. In various implementations, the query is received from an application.

In various implementations, providing the response includes providing a verbal response including one or more words. In various implementations, providing the response includes providing an audio response. For example, in FIG. 4X, in addition to displaying the response indicator 482, the electronic device produces the sound of a voice saying "The front door is locked." In various implementations, providing the response includes displaying a response window including at least a portion of the image of the environment at the particular time. For example, in FIG. 4X, the electronic device displays the response window 483 including the image 484.

In various implementations, the response indicates a latest time the status of the object was determined. For example, in various implementations, the query is "What is the thermostat set to?" and the response indicates the status of the thermostat 416 at the last time the thermostat 416 was detected.

In various implementations, the device detects the object multiple times and stores an entry in the database indicating the status of the object for each time the object is detected. Thus, in various implementations, the method 600 includes capturing, using the image sensor, a second image of a second environment at a second particular time. In various implementations, the second environment is different than the environment. In various implementations, the second environment is the same as the environment. The method 600 includes detecting the object in the second image of the second environment. The method 500 includes determining a second status of the object based at least in part on the second image of the environment and storing, in the database, a second entry including data indicating the second status of the object in association with data indicating the second particular time. In various implementations, providing a response to the query is based on the data indicating the second particular time (and the particular time). For example, in various implementations, the query is "What was the lowest setting on the thermostat today?" the response indicates the lowest status of the thermostat 416 in multiple detections.

In various implementations, the device determines the statuses of multiple different objects and stores an entry in the database for each time any of the objects is detected. Thus, in various implementations, the method 600 includes capturing, using the image sensor, a second image of a second environment at a second particular time. The method 600 includes detecting a second object in the second image of the second environment, wherein the second object is different than the first object. The method 600 includes, in accordance with a determination that the object is included within the predefined set of objects, determining a status of the second object based at least in part on the second image of the second environment. The method 600 includes storing, in the database, a second entry including data indicating the status of the second object in association with data indicating the second particular time. In various implementations, the method includes receiving, from a user, a second query regarding the second context and providing a response to the second query based on data indicating the second particular time.

In various implementations, the device attempts to detect contexts in each captured image of the environment. However, in various implementations, to reduce processing power expenditure in attempting to detect contexts in each captured image, the device attempts to detect contexts periodically in a subset of the images (e.g., once a second or once a minute). In various implementations, detecting the context (in block 520) is performed in response to determining that a function of the image of the environment breaches an interest threshold. In various implementations, the function of the image of the environment includes a difference between the image of the environment and a baseline image of the environment previously captured. If the function of the image of the environment is greater than the interest threshold, the device detects contexts in the image and sets the image of the environment as the baseline image of the environment. If the function of the image of the environment is less than the interest threshold, the device forgoes detecting contexts in the image. In various implementations, the function of the image of the environment is greater if the user's hands are detected in the image, indicating user interaction and a greater likelihood that an activity context will be detected.

The described technology may gather and use information from various sources. This information may, in some instances, include personal information that identifies or may be used to locate or contact a specific individual. This personal information may include demographic data, location data, telephone numbers, email addresses, date of birth, social media account names, work or home addresses, data or records associated with a user's health or fitness level, or other personal or identifying information.

The collection, storage, transfer, disclosure, analysis, or other use of personal information should comply with well-established privacy policies or practices. Privacy policies and practices that are generally recognized as meeting or exceeding industry or governmental requirements should be implemented and used. Personal information should be collected for legitimate and reasonable uses and not shared or sold outside of those uses. The collection or sharing of information should occur after receipt of the user's informed consent.

It is contemplated that, in some instances, users may selectively prevent the use of, or access to, personal information. Hardware or software features may be provided to prevent or block access to personal information. Personal information should be handled to reduce the risk of unintentional or unauthorized access or use. Risk can be reduced by limiting the collection of data and deleting the data once it is no longer needed. When applicable, data de-identification may be used to protect a user's privacy.

Although the described technology may broadly include the use of personal information, it may be implemented without accessing such personal information. In other words, the present technology may not be rendered inoperable due to the lack of some or all of such personal information.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device including an image sensor, one or more processors, and non-transitory memory:

capturing, using the image sensor, an image of an environment at a particular time;

detecting a context based at least in part on the image of the environment;

in accordance with a determination that the context is included within a predefined set of contexts, storing, in a database, an entry including data indicating detection of the context in association with data indicating the particular time;

receiving a query including an indication of the context;

determining the particular time based on the indication of the context and the entry; and providing a response to the query based on the particular time.

2. The method of claim 1, wherein detecting the context includes detecting a physical object present in the environment.

3. The method of claim 1, wherein detecting the context includes detecting an activity performed in the environment.

4. The method of claim 1, wherein detecting the context includes detecting a status of an object present in the environment.

5. The method of claim 1, wherein detecting the context is further based on at least one of sound in the environment at the particular time or motion of the device at the particular time.

6. The method of claim 1, wherein the entry further includes data indicating a location of the device at the particular time.

7. The method of claim 1, wherein the entry further includes at least a portion of the image of the environment at the particular time.

8. The method of claim 1, wherein the response indicates a latest time the context was detected.

9. The method of claim 1, wherein the response indicates a location of the device at a latest time the context was detected.

10. The method of claim 1, wherein the response indicates a number of times the context was detected within a time window.

11. The method of claim 1, wherein providing the response includes providing a verbal response.

12. The method of claim 1, wherein providing the response includes displaying a response window including at least a portion of the image of the environment at the particular time.

13. The method of claim 1, further comprising:

capturing, using the image sensor, a second image of a second environment at a second particular time;

detecting the context based at least in part on the second image of the second environment;

storing, in the database, a second entry including data indicating detection of the context in association with data indicating the second particular time; and determining the second particular time based on the indication of the context and the second entry, wherein providing the response to the query is based on the second particular time.

14. The method of claim 1, further comprising:

capturing, using the image sensor, a second image of a second environment at a second particular time;

detecting a second context based at least in part on the second image of the second environment, wherein the second context is different than the context;

in accordance with a determination that the second context is included within the predefined set of contexts, storing, in the database, a second entry including data indicating detection of the second context in association with data indicating the second particular time;

receiving, from a user, a second query including an indication of the second context;

determining the second particular time based on the indication of the second context and the second entry; and providing a response to the second query based on the second particular time.

15. The method of claim 1, further comprising receiving user input indicative of registration of the context, the registration causing the context to be included within the predefined set of contexts.

16. The method of claim 15, wherein the user input indicative of registration of the context includes selection of a pre-programmed context.

17. The method of claim 15, wherein the user input indicative of registration of the context includes demonstration of the context.

18. The method of claim 1, wherein detecting the context is performed in response to determining that a function of the image of the environment breaches an interest threshold.

19. A device comprising:

an image sensor;

a non-transitory memory; and one or more processors to:

capture, using the image sensor, an image of an environment at a particular time;

detect a context based at least in part on the image of the environment;

in accordance with a determination that the context is included within a predefined set of contexts, store, in a database, an entry including data indicating detection of the context in association with data indicating the particular time;

receive a query including an indication of the context;

determine the particular time based on the indication of the context and the entry; and provide a response to the query based on the data indicating the particular time.

20. A non-transitory computer-readable medium having instructions encoded thereon which, when executed by a device including a processor and an image sensor, causes the device to:

capture, using the image sensor, an image of an environment at a particular time;

detect a context based at least in part on the image of the environment;

in accordance with a determination that the context is included within a predefined set of contexts, store, in a database, an entry including data indicating detection of the context in association with data indicating the particular time;

receive a query including an indication of the context;

determine the particular time based on the indication of the context and the entry; and provide a response to the query based on the data indicating the particular time.

* * * * *